US006488591B1

(12) United States Patent
Gobush et al.

(10) Patent No.: US 6,488,591 B1
(45) Date of Patent: *Dec. 3, 2002

(54) METHOD AND APPARATUS TO DETERMINE GOLF BALL TRAJECTORY AND FLIGHT

(75) Inventors: William Gobush, North Dartmouth, MA (US); Diane Pelletier, Fairhaven, MA (US); Douglas C. Winfield, Mattapoisett, MA (US); Charles Days, South Dartmouth, MA (US); Steven Aoyama, Marion, MA (US); Edmund A. Hebert, Fairhaven, MA (US); James Alan Silveira, Bristol, RI (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/566,803

(22) Filed: May 8, 2000

Related U.S. Application Data

(62) Division of application No. 09/156,611, filed on Sep. 18, 1998, now Pat. No. 6,241,622.

(51) Int. Cl.[7] ........................ A63B 69/36; H04N 7/18; G06K 9/00

(52) U.S. Cl. ........................ 473/199; 473/409; 382/164

(58) Field of Search ........................ 473/131, 140–141, 473/198–200, 219–226, 351, 353, 409; 382/106, 107, 162, 164–165; 358/538, 537; 700/91; 434/247–249, 251, 252; 348/552, 61, 143, 169, 207.99, 207.1, 207.11, 208.14

(56) References Cited

U.S. PATENT DOCUMENTS

| | | | |
|---|---|---|---|
| 3,513,707 A | 5/1970 | Russell et al. ................. | 73/379 |
| 3,630,601 A | 12/1971 | Lehovec ...................... | 356/256 |
| 3,918,073 A | 11/1975 | Henderson et al. .......... | 354/120 |
| 4,063,259 A | 12/1977 | Lynch et al. ................. | 354/120 |
| 4,136,387 A | 1/1979 | Sullivan et al. .............. | 364/410 |
| 4,137,556 A | 1/1979 | Sessa ........................... | 361/91 |
| 4,158,853 A | 6/1979 | Sullivan et al. ............... | 358/93 |
| 4,160,942 A | 7/1979 | Lynch et al. ................. | 350/120 |
| 4,375,887 A | 3/1983 | Lynch et al. .................. | 273/32 |

(List continued on next page.)

OTHER PUBLICATIONS

The Wall Street Journal, Nov. 1997, Bill Richards, "Why It Takes a Rocket Scientist to Design a Golf Ball," pp. B1 and B11.

Scientific American, Jan. 1997, Mion et al., "Tackling Turbulence with Supercomputers," pp. 62–68.

Science and Golf II, 1st Edition, Jul. 1994, Gobush et al., "Video Monitoring System to Measure Initial Launch Characteristics of Golf Ball," Ch. 50, pp. 327–333.

Science and Golf, 1st Edition, Jul., 1990, Chiraraishi et al., "A new method on measurement of trajectories of a golf ball", pp. 193–198.

Science and Golf, 1st Edition, S. Aoyama, Jul. 1990, "A modern method for the measurement of aerodynamic lift and drag on golf balls," pp. 199–204.

*Primary Examiner*—Mark Sager
(74) *Attorney, Agent, or Firm*—Swidler Berlin Shereff Friedman LLP

(57) ABSTRACT

A launch monitor system including a support structure, a first light-reflecting element disposed on this support structure, a lighting unit and an camera unit. A computer receives signals generated by light patterns received by the camera unit and computes a variety of flight characteristics for the object. The system may be moved back and forth to vary the field-of-view of the camera unit. The system also computes and displays object trajectories from the computed flight characteristics which account for the characteristics of the object and the atmospheric conditions.

17 Claims, 19 Drawing Sheets

U.S. PATENT DOCUMENTS

| | | |
|---|---|---|
| 4,461,477 A | 7/1984 | Stewart ........................ 273/26 |
| 4,477,079 A | 10/1984 | White .................... 273/186 R |
| 4,695,888 A | 9/1987 | Peterson ................ 358/213.13 |
| 4,695,891 A | 9/1987 | Peterson ................ 358/213.13 |
| 4,713,686 A | 12/1987 | Ozaki et al. ................ 358/107 |
| 4,858,934 A | 8/1989 | Ladick et al. ........... 273/186 A |
| 4,893,182 A | 1/1990 | Gautraud et al. ........... 358/105 |
| 5,101,268 A | 3/1992 | Ohba .......................... 358/88 |
| 5,111,410 A | 5/1992 | Nakayama et al. .... 364/551.01 |
| 5,179,441 A | 1/1993 | Anderson et al. ............. 358/88 |
| 5,210,603 A | 5/1993 | Sabin .......................... 358/93 |
| 5,297,796 A | 3/1994 | Peterson .................. 273/183.1 |
| 5,342,054 A | 8/1994 | Chang et al. ............. 273/186.1 |
| 5,471,383 A | 11/1995 | Gobush et al. ............. 364/410 |
| 5,501,463 A | 3/1996 | Gobush et al. ......... 273/184 R |
| 5,575,719 A | 11/1996 | Gobush et al. ............. 473/223 |
| 5,589,628 A | 12/1996 | Braly ........................ 73/12.02 |
| 5,634,855 A * | 6/1997 | King |
| 5,803,823 A | 9/1998 | Gobush et al. ............. 473/223 |

\* cited by examiner

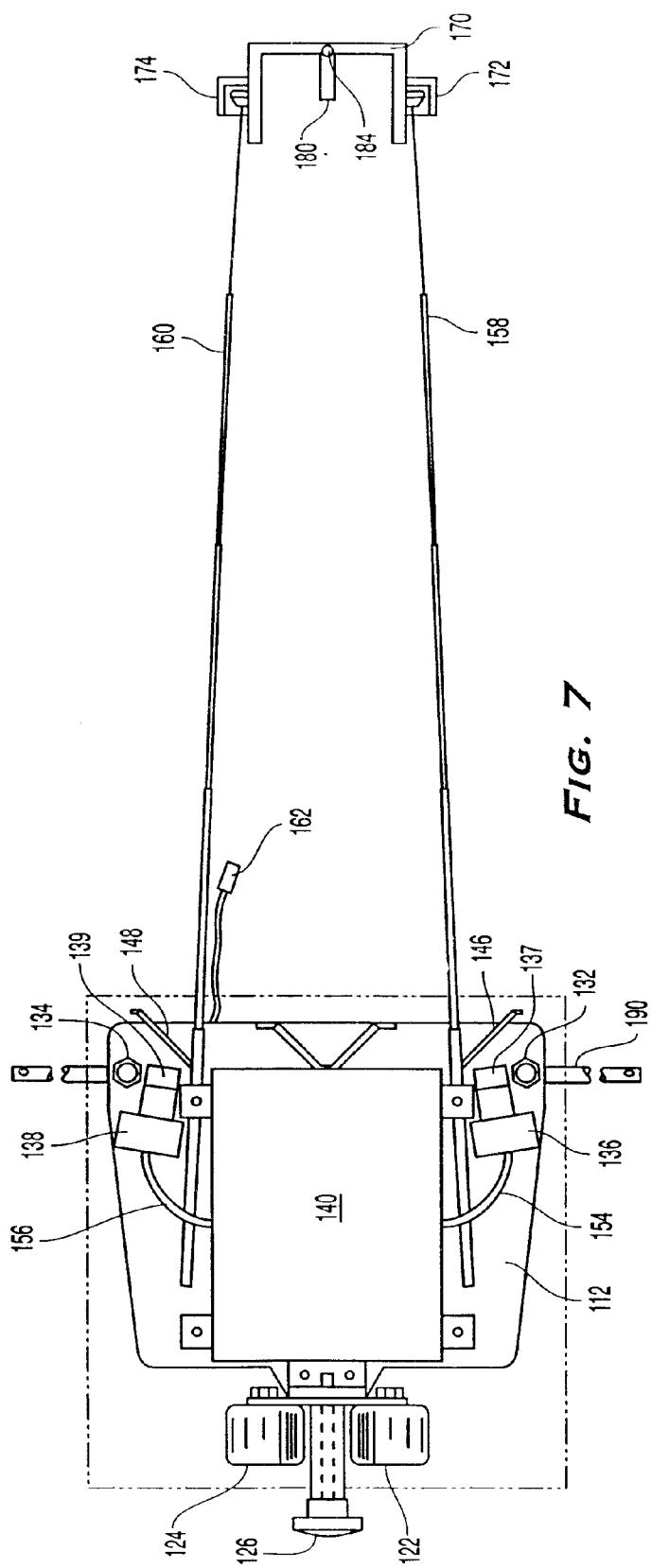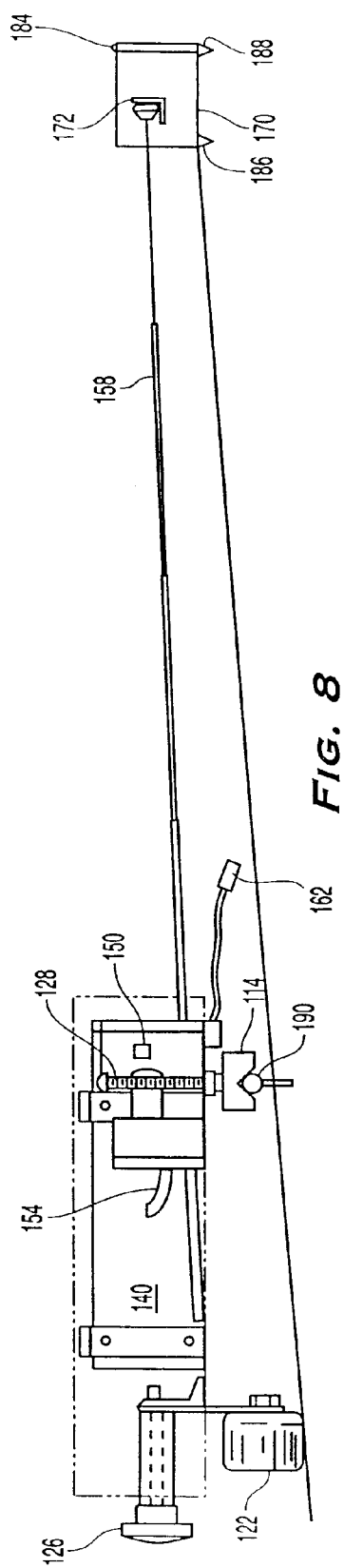

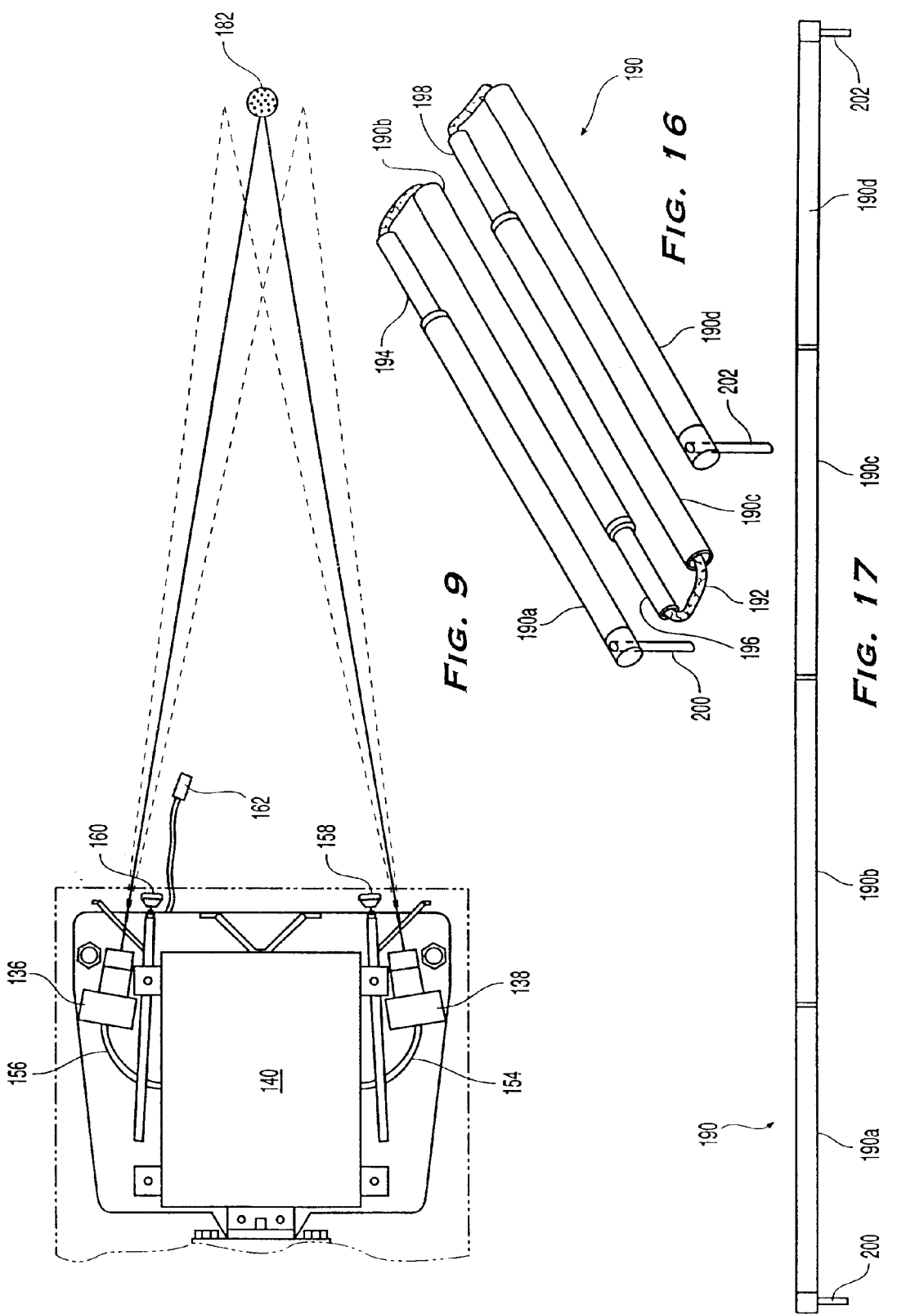

METHOD AND APPARATUS TO DETERMINE GOLF BALL TRAJECTORY AND FLIGHT

This application is a divisional application of U.S. application Ser. No. 09/156,611 filed on Sep. 18, 1998, now U.S. Pat. No. 6,241,622, which is incorporated herein by reference in its entirety.

BACKGROUND OF THE INVENTION

Apparatus for measuring golf ball flight characteristics are known (U.S. Pat. Nos. 4,063,259; 4,375,887; 4,158,853; and 4,136,387). Techniques of detecting golf club head position and golf ball position shortly after impact using photoelectric means to trigger a flash to permit a photograph to be taken of the club head have been disclosed (U.S. Pat. Nos. 4,063,259 and 4,375,887). Golf ball or golf club head movement has been determined by placing reflective areas on a golf ball along with use of electro-optical sensors (U.S. Pat. No. 4,136,387). The electro-optical sensing of light sources on both the golfer's body and club has also been disclosed (U.S. Pat. No. 4,137,566). In addition, apparatus for monitoring a golfer and the golf club being swung has also been disclosed (U.S. Pat. No. 4,137,566).

One particularly troublesome aspect of past systems for measuring golf ball flight characteristics relates to their lack of portability. In this regard, prior systems have generally required cameras, sensors and strobe lights set up in various positions about the golfer. In addition, past systems have not had the ability to be utilized outdoors but have had to be set up indoors under less than ideal or realistic golfing conditions. As prior golf ball and/or golf club monitoring systems have not been portable and have not been capable of practical use outdoors, the systems have not been usable in the most desirable teaching or club fitting locations, e.g., on an outdoor driving range. Also, while the systems disclosed in the related applications and patents mentioned above, which are incorporated herein by reference) are portable and are capable of use outdoors, further improvements related to increased portability would be desirable to allow easier transportation of the unit between sites and easier movement of the unit at any particular site.

One additional area that has not been adequately addressed by past golf ball launch monitoring systems relates to the area of predicting flight path differences based on different physical characteristics of golf balls and/or different atmospheric conditions that a golfer may encounter after being tested by the launch monitor system. It would therefore be desirable to provide a system which measures the launch or flight characteristics of a golf ball having a particular construction, such as a two-piece construction and under ideal atmospheric conditions and then provide the golfer with revised golf ball flight results based on computer predictions for golf balls having different physical characteristics (such as a three-piece golf ball) and different atmospheric conditions (such as higher elevations, higher humidity or more adverse wind conditions).

SUMMARY OF THE INVENTION

Broadly, the present invention comprises method and apparatus for measuring the speed, direction, and orientation of a golf ball and from such data computing the flight path of the golf ball.

It is a feature that the method and apparatus particularly apply to golf equipment and that the present invention provides a golfer with data relating to the variables of his swing useful in improving the swing and in selecting advantageous equipment for use, including the types of golf balls.

In particular, the present invention contemplates a launch monitor system for measuring launch characteristics of a golf ball from data taken when the golf ball is in a predetermined field-of-view. The system preferably includes a support structure, which is a single, portable support structure, light-reflecting elements disposed on the support structure, a lighting unit, and camera units. The lighting unit includes a light source directed at the light-reflecting elements for reflecting light into the predetermined field-of-view, and the electro-optical units, disposed on the support structure in proximity to the light-reflecting elements, are directed toward the predetermined field-of-view. The light-reflecting elements include an aperture and the camera units are disposed to monitor the predetermined field-of-view through the aperture.

This allows, for example, the system to be used outdoors in a grassy area and for the hitting area to be slightly varied to move the player away from divots, etc. The support elements may include slide pads, wheels, or combinations of both. The support elements may be height-adjustable to vary the orientation and direction of view of the system and, specifically, the camera units. As an additional aspect of the invention, a distance calibrator is provided for calibrating the distance between the camera unit or units and the predetermined field-of-view.

It is an object of the system to measure launch characteristics of an object after it is struck by a striking instrument.

It is a further object of the invention to provide computing means to calculate the trajectory of the object from the launch characteristics and information on the environmental conditions and the object's characteristics and to generate statistics on these object trajectories.

It is a further object of the invention to provide a control means to manage the tasks performed by the system including camera activation, shutter control, image capture, calculation of launch characteristics, calculation of object trajectories, and generation of object trajectory statistics.

BRIEF DESCRIPTION OF THE DRAWINGS

FIG. 7 is a top view of the apparatus shown in FIG. 6 and generally showing calibration of the system;

FIG. 8 is a side elevational view of the system shown in FIGS. 6 and 7;

FIG. 9 is a top view of the system shown in FIGS. 6–8 and generally showing a golf ball in place under operating conditions;

FIG. 16 is a perspective view of an unassembled rod useful for allowing movement of a system constructed in accordance with the invention;

FIG. 17 is an elevational view of the rod of FIG. 16 shown in an assembled condition;

DESCRIPTION OF THE PREFERRED EMBODIMENT

Figure 1:
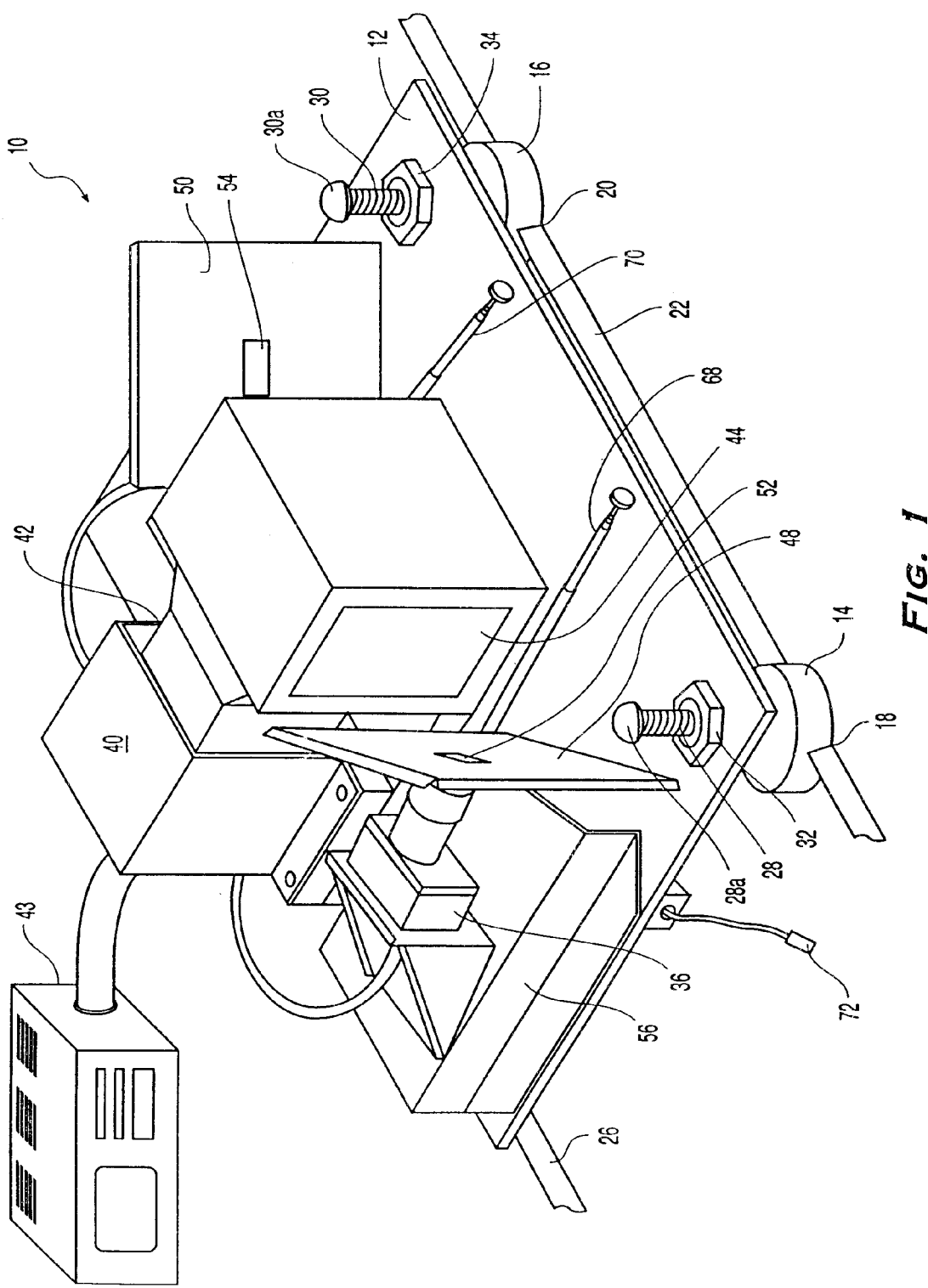
FIG. 1 is a perspective view of a first embodiment of the present invention.

FIG. 1 illustrates a preferred first embodiment of the invention in the form of a portable launch monitoring system 10 including a base or support structure 12 and attached support elements 14, 16. Support elements 14, 16 are specifically shown as slide pads each including V-shaped notches 18, 20, which allow the pads 14, 16 to slide along a rod 22. Another slide pad 24 attached to the system 10 at the rear (shown in FIG. 3) similarly slides along a rod 26. One or more slide pads 14, 16, and 24 may be replaced by other support elements with different configurations or methods of moving, such as wheels. By the term "slide pads," applicants intend to cover any elements allowing the system 10 to slide or move back and forth relative to a predetermined field-of-view. Slide pads 14, 16 include a height adjustment feature allowing the front corners of system 10 to be raised or lowered for leveling purposes. Specifically, each slide pad 14, 16 is attached to support structure 12 by respective threaded rods 28, 30 and nuts 32, 34 fixed to the support structure 12. Rods 28, 30 each include a drive portion 28a, 30a that may be used to adjust pads 14, 16.

Figure 2:
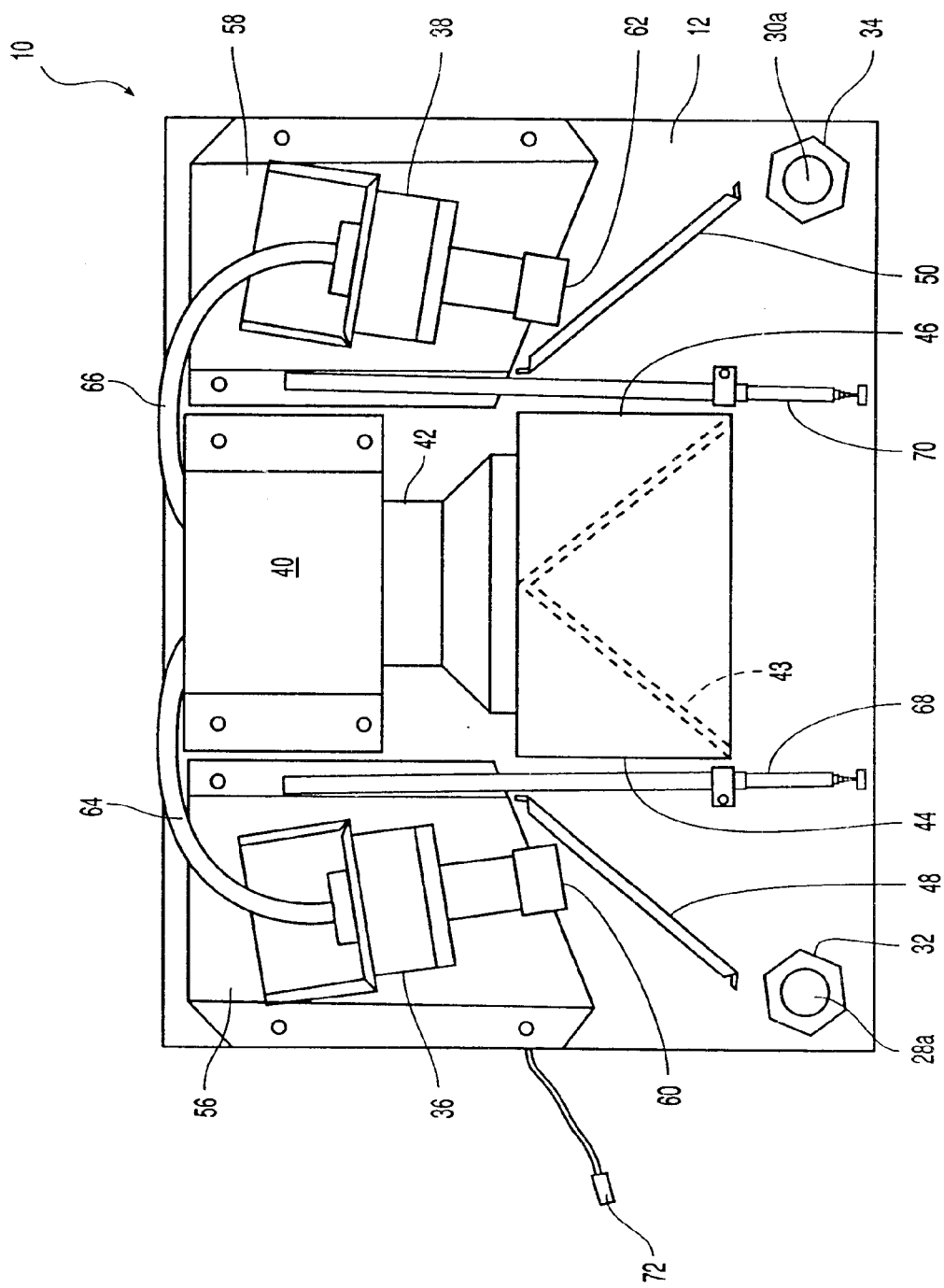
FIG. 2 is a top view thereof.
Figure 3:
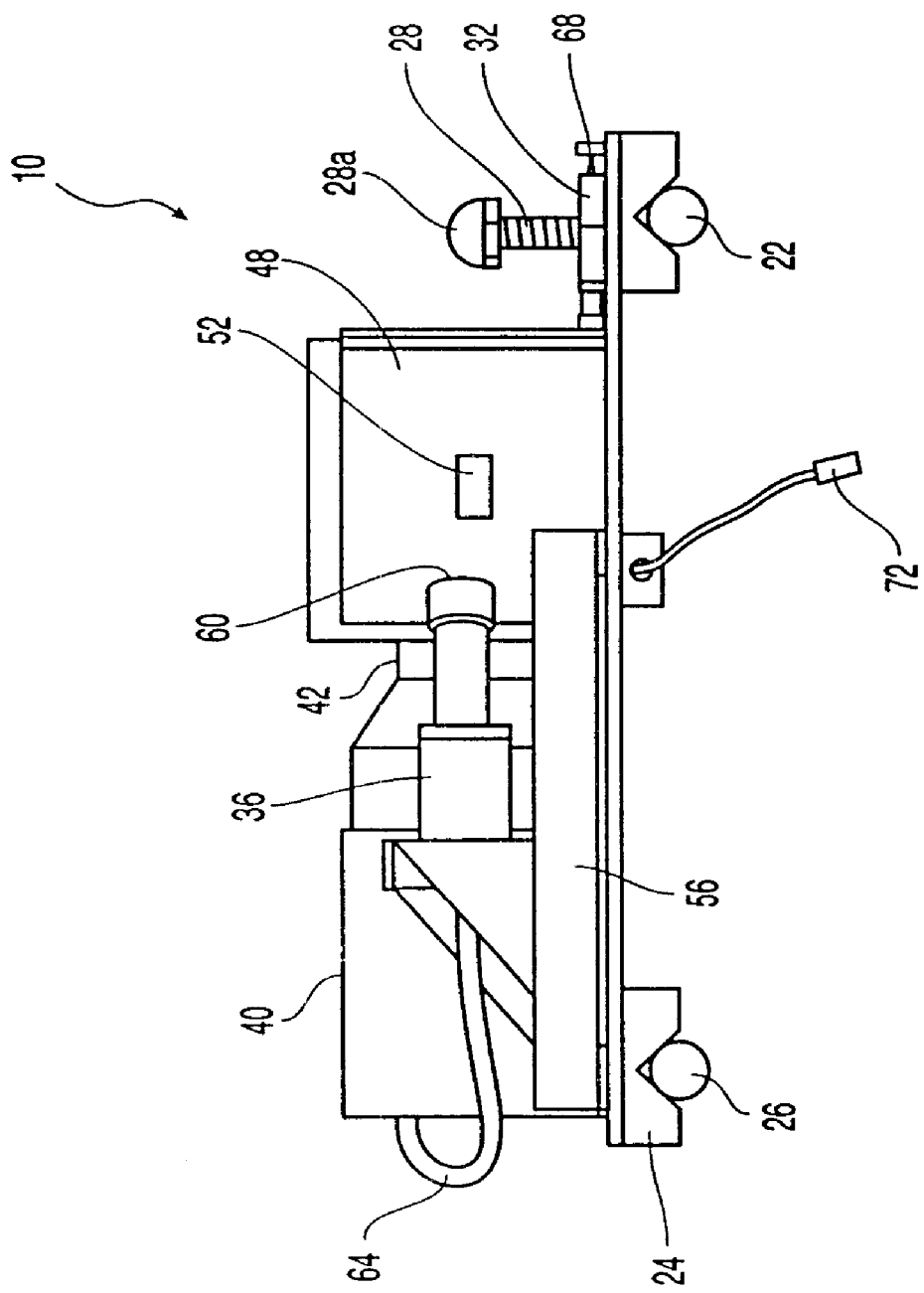
FIG. 3 is a side elevational view of the system shown in FIGS. 1 and 2.
Figure 4:
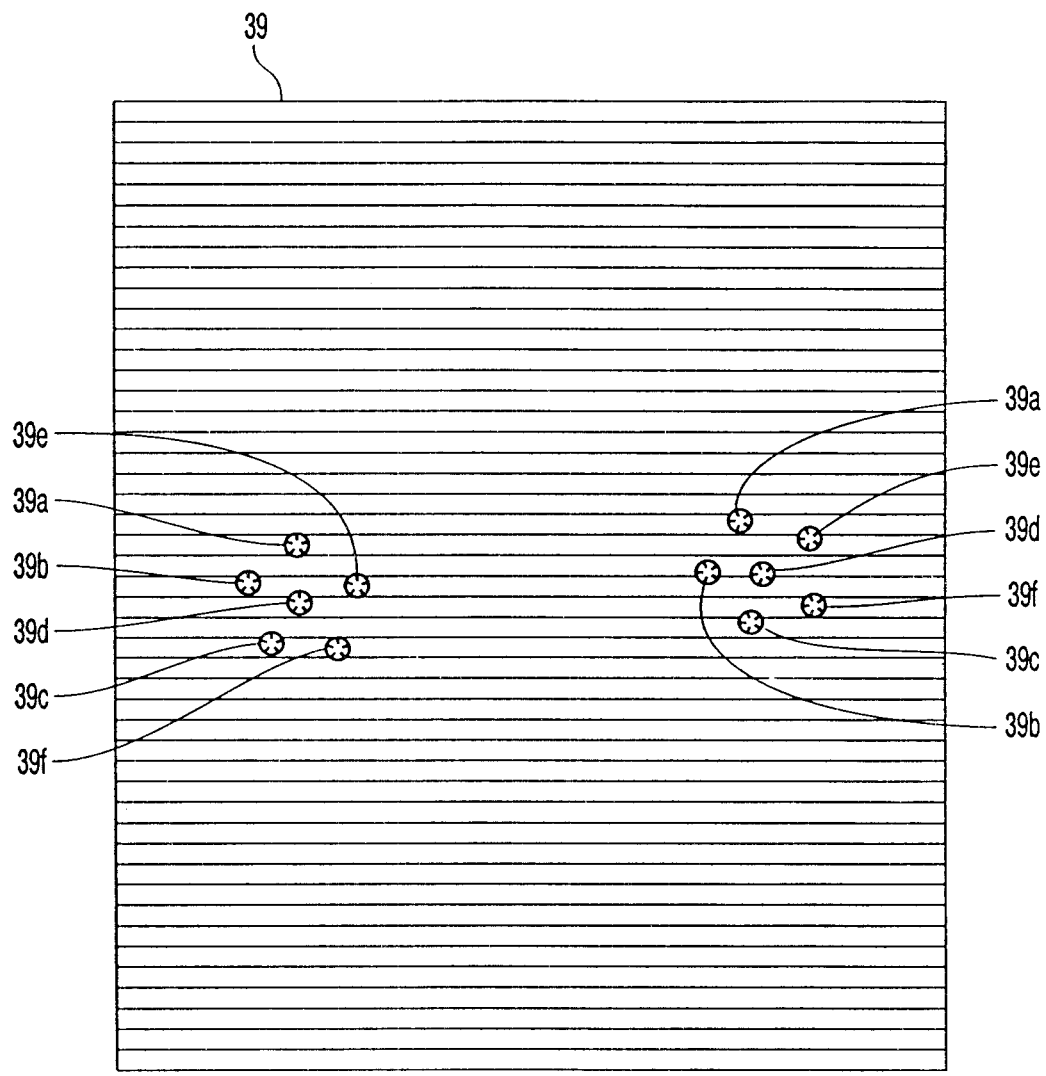
FIG. 4 is an elevational view of the light receiving and sensory grid panel located in each camera.

Referring now to FIGS. 1–3, launch monitoring system 10 further includes first and second camera units 36, 38, a centrally disposed control box 40, and a dual strobe lighting unit 42. First and second camera units 36, 38 are preferably ELECTRIM EDC-1000U Computer Cameras from Electrim Corporation in Princeton, N.J. Charge coupled device or CCD cameras are preferred but TV-type video cameras are also useful. The angle between the two cameras' line of sight is preferably in the range of 10–30, with 22 being most preferable. Each of the cameras 36, 38 has a light-receiving aperture, shutter, and light sensitive silicon panel 39 (see FIG. 4, showing a silicon panel, which also generally corresponds to an image captured by the cameras and used by the system). The cameras are directed and focused on a predetermined field-of-view in which a golf ball moves and is imaged.

Figure 5:
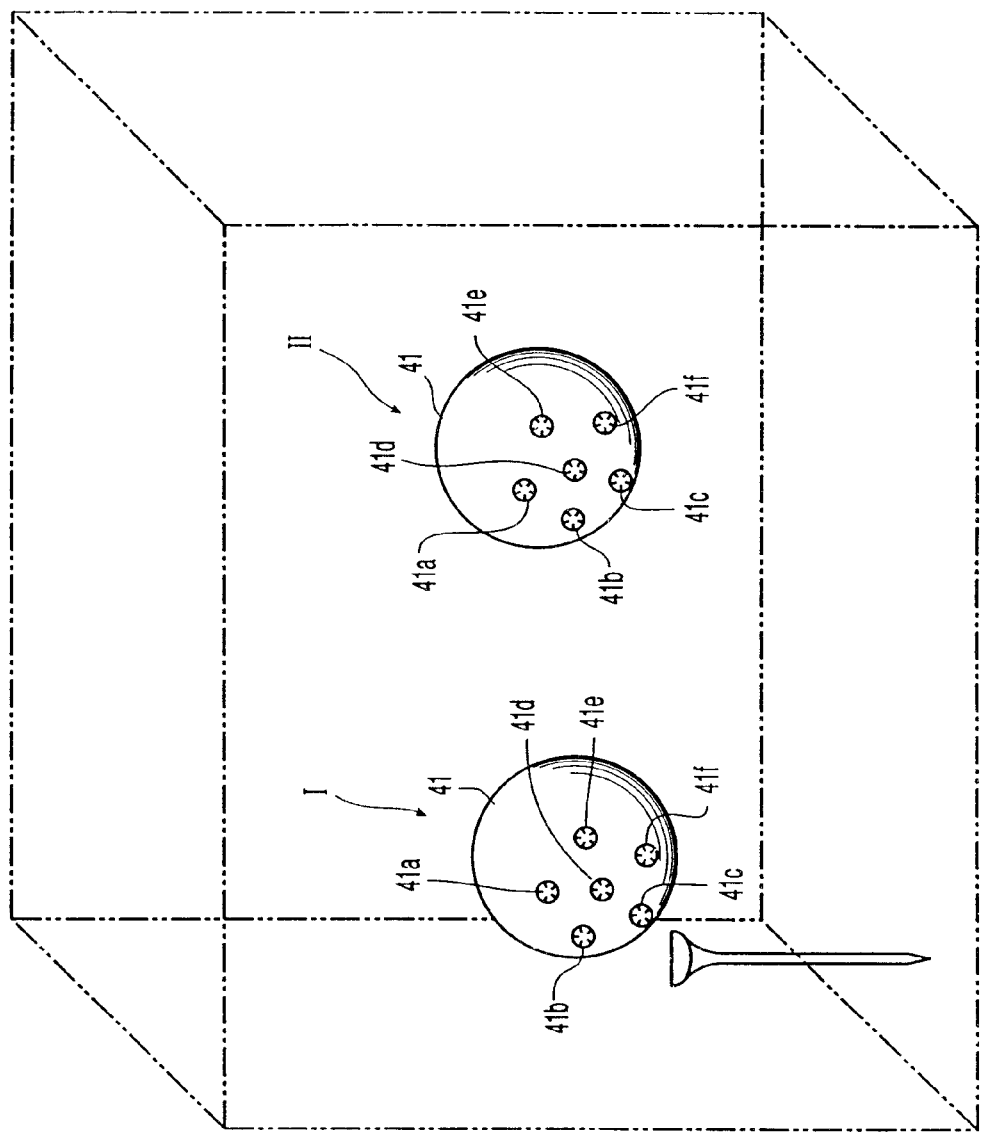
FIG. 5 is a perspective view of a three-dimensional rectilinear field showing a golf ball at two different positions I and II.

As shown in a three-dimensional, predetermined, rectilinear field-of-view (shown in phantom) in FIG. 5, golf ball 41 preferably has six (6) reflective, spaced-apart round areas or dots 41a–f placed thereon. Golf ball 41 is shown in two positions I and II to illustrate the preferred embodiment, corresponding to the locations of the golf ball 41 when imaged by the system. In positions I and II the golf ball is shown after being struck. The image taken at position I occurs at a first time and occurs at in position II at a second time. The preferred diameters of the round dots 41a–f range from one-tenth ($\frac{1}{10}$) to one-eighth ($\frac{1}{8}$) of an inch, but other sized and shaped areas can be used. Dots 41a–f are preferably made of reflective material which is adhered to the golf ball. The Scotchlite™ brand beaded material made by Minnesota Mining and Manufacturing (3M) is preferred for forming the dots. Corner-reflective retro-reflectors may also be used. Alternatively, painted spots can be used that define contrasting areas. The number of dots or areas may be as few as three (3) and up to six (6) or more for the golf ball, provided each dot or area reflects light from the golf ball in both positions shown in FIG. 5. As a result of the positioning of the cameras 36, 38 and the dots 41a–f, both cameras 36 and 38 are capable of receiving light reflected by dots 41a–f, which appear as bright areas 39a–f on the silicon panel 39 (as shown in FIG. 4) and the corresponding image. Alternatively, the dots may be non-reflective, appearing as dark areas 39a–f on the silicon panel.

Reflective materials as compared with the coated surface of the golf ball can be as high as nine hundred (900) times brighter where the divergence angle between the beam of light striking the dots 41a–f and the beam of light from such dots to the camera aperture is zero or close to zero. As the divergence angle increases, the ratio of brightness of such dots 41a–f to the background decreases. It will be appreciated that electromagnetic waves outside the range of visible light, such as infra red light, may be used to make the flash light invisible to the golfer.

The control box 40 communicates via an asynchronous protocol via a computer's parallel port to the camera units 36, 38 to control their activation and the dual strobe lighting unit 42 to set off the successive flashes. Dual strobe lighting unit 42 includes two Vivitar Automatic Electronic Flash Model 283 strobe lights mounted on top of one another. These strobe lights sequentially direct light onto a beam splitter 43 and then out of the unit through windows 44 and 46 to reflective elements or panels 48, 50 and then to the predetermined field-of-view. Panels 48, 50 may be plates formed of polished metal, such as stainless steel or chrome-plated metal. Other light reflective elements may also be used without departing from the spirit or scope of the invention. Each reflective panel 48, 50 includes an aperture 52, 54. Cameras 36, 38 are fixed on support structure 56, 58 and are thereby disposed with their respective lenses 60, 62 directed to the predetermined field-of-view through apertures 52, 54. Video lines 64, 66 feed the video signals into control box 40 for subsequent use.

The locations of the strobe lights, beam splitter, reflective elements and cameras allow the light directed from the strobe to enter the field-of-view and be reflected back from the ball, due to the reflective dots, to the camera lenses through the apertures. In another embodiment, ring-shaped strobe lights can be used which surround each camera lens. Since the ring-shaped strobe lights are positioned close to the lenses and the center axis of the strobe is aligned with the center of the lenses, the light once reflected off the markers would enter the lenses. Thus, eliminating the need for the reflective elements.

Preferably, telescoping distance calibrators 68, 70 are affixed to support structure 12. The telescoping members are used in calibrating launch monitoring system 10 at the appropriate distance from an object to be monitored. Distance calibrators 68, 70 are extendable members for example conventional radio antennae can be used. Calibrators 68, 70 are used in conjunction with a calibration fixture shown in FIG. 15 and discussed in detail below with respect to the second embodiment. It will be understood that the same calibration fixture is preferably used with both the first and second embodiments. At least one distance calibrator should be used.

In this first embodiment, a microphone 72 is used to begin the operation of the system 10. When the golf club hits the golf ball, a first image of the golf ball 41 in the predetermined field-of-view is taken, as shown in FIG. 5 position I, in response to the sound being transmitted by the microphone 72 to the system 10. Since the system 10 is preferably used to monitor only the golf ball, although it could also be used to monitor the golf club, the first of the two images needs only to be taken once the golf ball is struck by the club, as illustrated by the golf ball in position I of FIG. 5. A laser or other apparatus (not shown) can also be used to initiate the system. For example, the initiating means can include a light beam and a sensor. When the moving golf ball passes through the light beam the sensor sends a signal to the system. When the laser is used, the laser is arranged such that a golf club breaks the laser beam just after (or at the time) of contact with the golf ball. That is, the laser is aligned directly in front of the teed golf ball and the first image taken as or shortly after the golf ball leaves the tee. The operation of the first embodiment is discussed in detail below after a description of the second embodiment.

FIGS. 6–10 illustrate a second embodiment of the present invention that further reduces the size and therefore increases the portability of the system.

Launch monitoring system 100 includes a base or support structure 112 that may also have a cover 113. Slide members or pads 114, 116 are utilized at a lower front portion of support structure 112 and include notches 118, 120 for receiving a rod 190 along which pads 114, 116 may slide. As shown in FIGS. 7 and 8, wheels 122, 124 replace the pad 24 disclosed with respect to the first embodiment shown in FIGS. 1–3. Wheels 122, 124 are attached for rotation and to support structure that includes a handle 126 for allowing an operator to move launch monitoring system 100 back and forth along the ground. Like the first embodiment, this second embodiment also includes threaded rods 128, 130 and respective nuts 132, 134 for allowing height adjustment at the front of launch monitoring system 100. The wheels may also be height adjusted relative to the support 112 to allow the system 100 to be adjusted depending on the terrain on which the system is placed. Although not shown for the second embodiment, the systems in the first and second embodiments also have a computer and monitor 43 (as shown in FIG. 1). The computer and monitor may be combined into a single element or be separate elements. The computer has several algorithms and programs used by the system to make the determinations discussed below.

Figure 6:
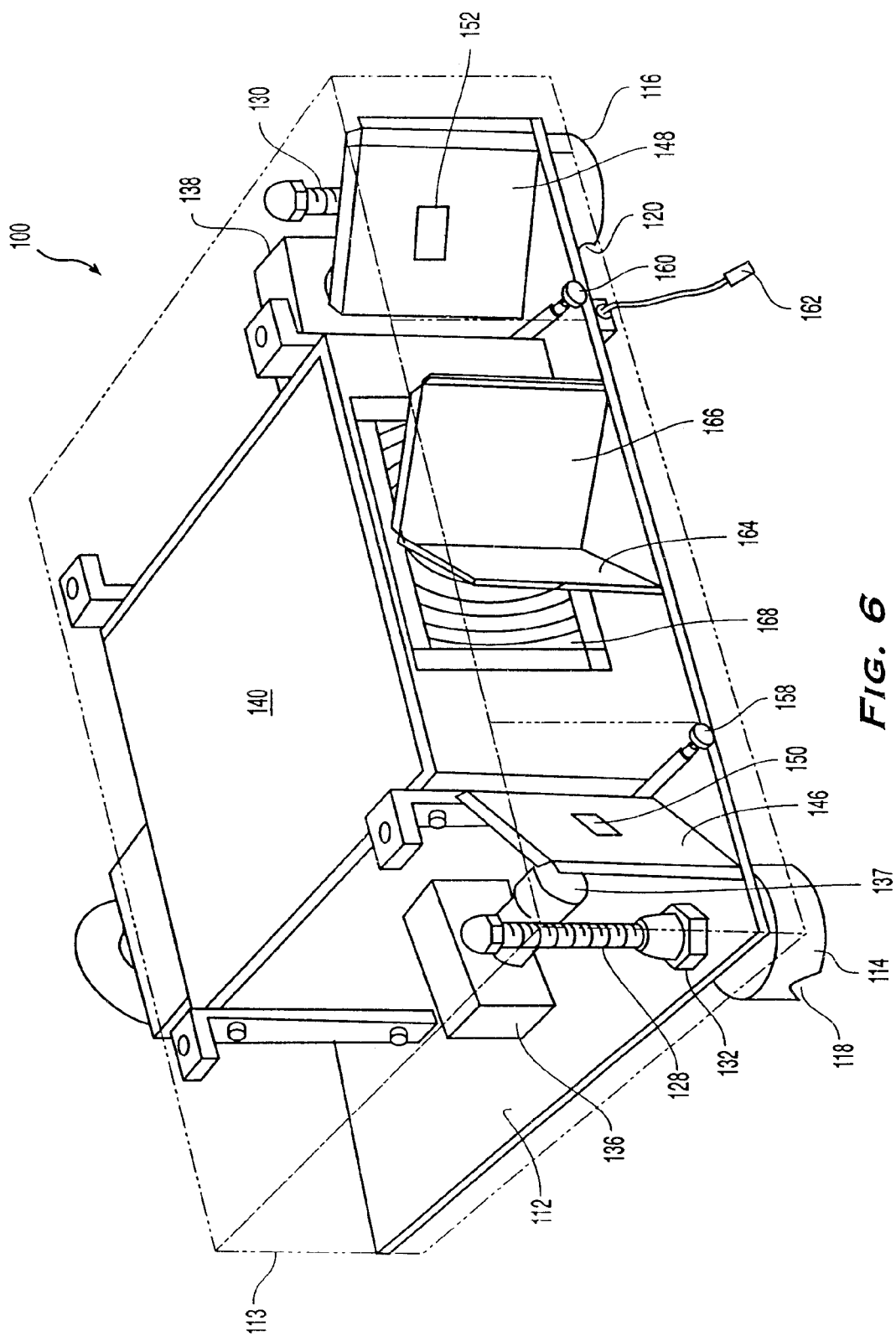
FIG. 6 is a perspective view of a second embodiment of this invention.

As further shown in FIGS. 6 and 7, first and second camera units 136, 138 are affixed to support structure 112. These electro-optical units 136, 138 are smaller than those disclosed with respect to the first embodiment and are preferably the ELECTRIM EDC-1000HR Computer Cameras available from the Electrim Corporation in Princeton, N.J. The cameras also have light-sensitive silicon panels as in the first embodiment. The cameras 136, 138 each have a line-of-sight, which are illustrated as solid lines in FIG. 9, that are directed to and focused on the predetermined field-of-view. As illustrated in FIG. 9 with the broken lines, the cameras' fields-of-view are larger than are necessary to image just a single golf ball. Thus, the predetermined field-of-view is the cameras' fields-of-view at the location where the cameras' lines-of-sight intersect.

Figure 10:
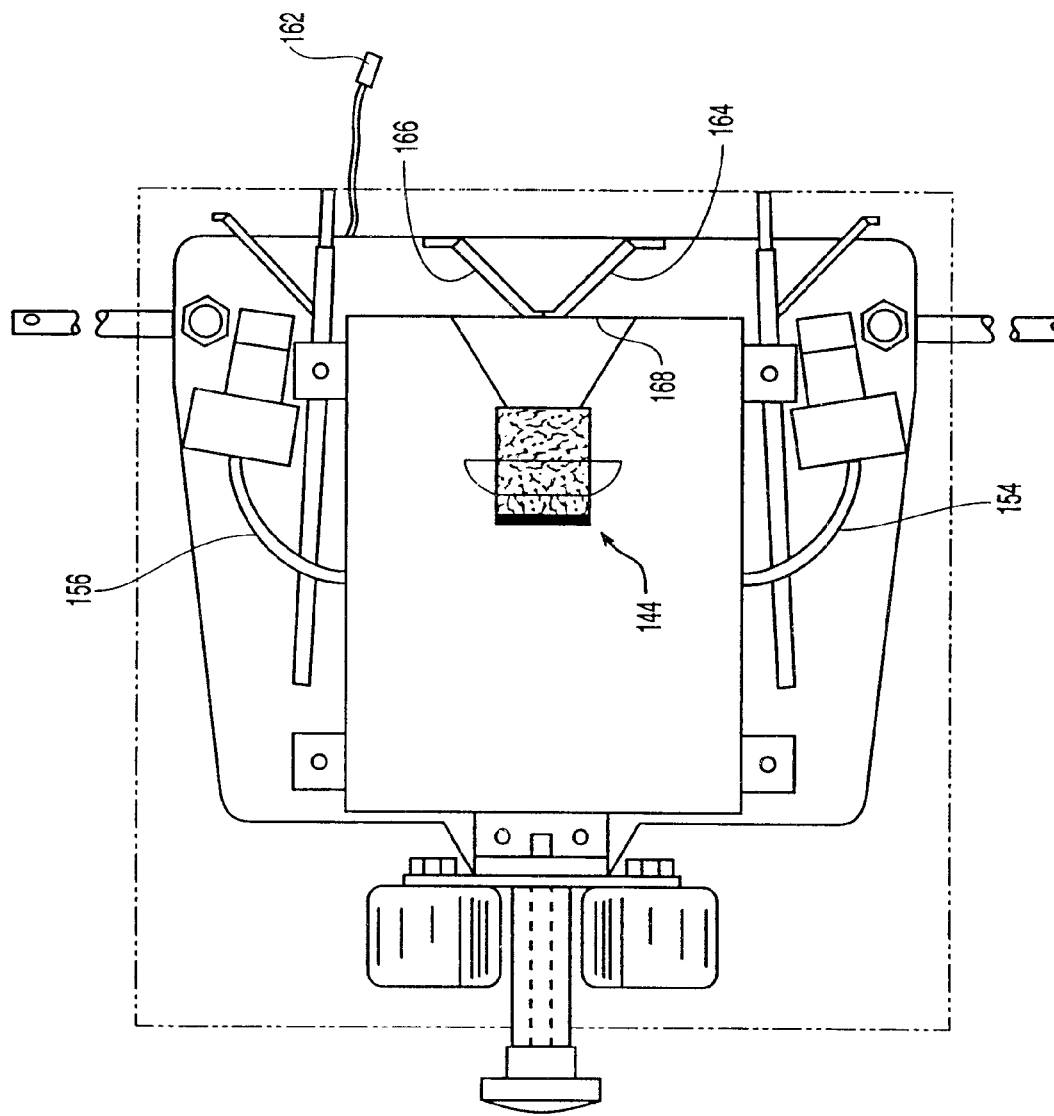
FIG. 10 is a partial, cut-away top view of the system shown in FIGS. 6–9 illustrating the strobe lighting unit.

A control box 140 is provided and includes a strobe light unit at a front portion thereof. As shown in FIG. 10, strobe light unit is comprised of a single flash bulb assembly 144, the related circuitry, and a cylindrical flash tube. The operation of which are described in more detail below. As best shown in FIG. 6, the reflective elements or panels 146, 148 are mounted to support structure 112 in a similar orientation to those discussed above with respect to the first embodiment. Reflective panels 146, 148 also include respective apertures 150, 152. Referring to FIGS. 6 and 7, cameras 136, 138 are mounted such that the lenses 137, 139 are directed through the respective apertures 150, 152 in the reflective panels 146, 148 to the predetermined field-of-view. Video lines 154, 156 from the respective electro-optical units 136, 138 lead to control box 140. Like the first embodiment, this embodiment includes distance calibrators also in the form of antenna 158, 160, and microphone 162 that also is used to initiate the operation of the system. Again, a laser or other method of initiating the system could be used.

Figure 11A:
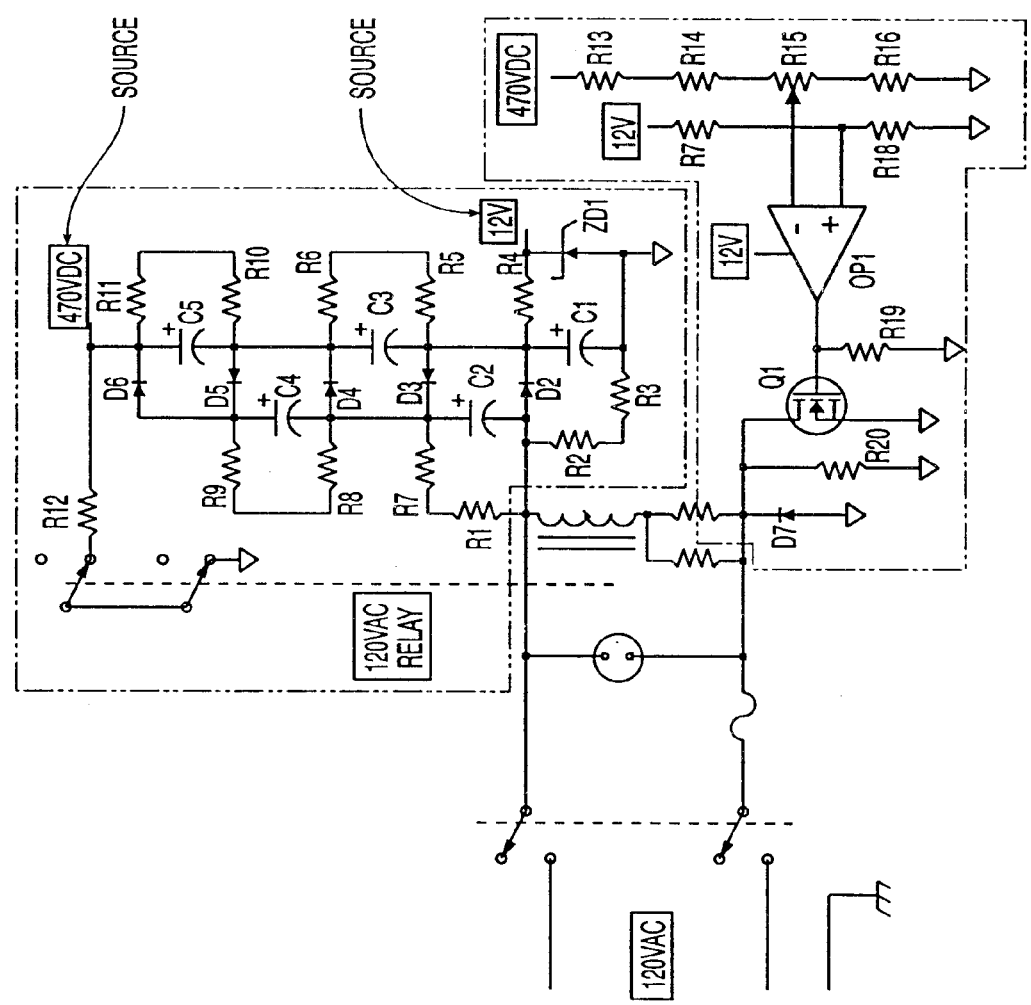
FIGS. 11A and 11B is a diagram of a voltage amplifier and regulator circuit and a trigger and discharge circuit, respectively, used in the system shown in FIGS. 6–10.
Figure 11B:
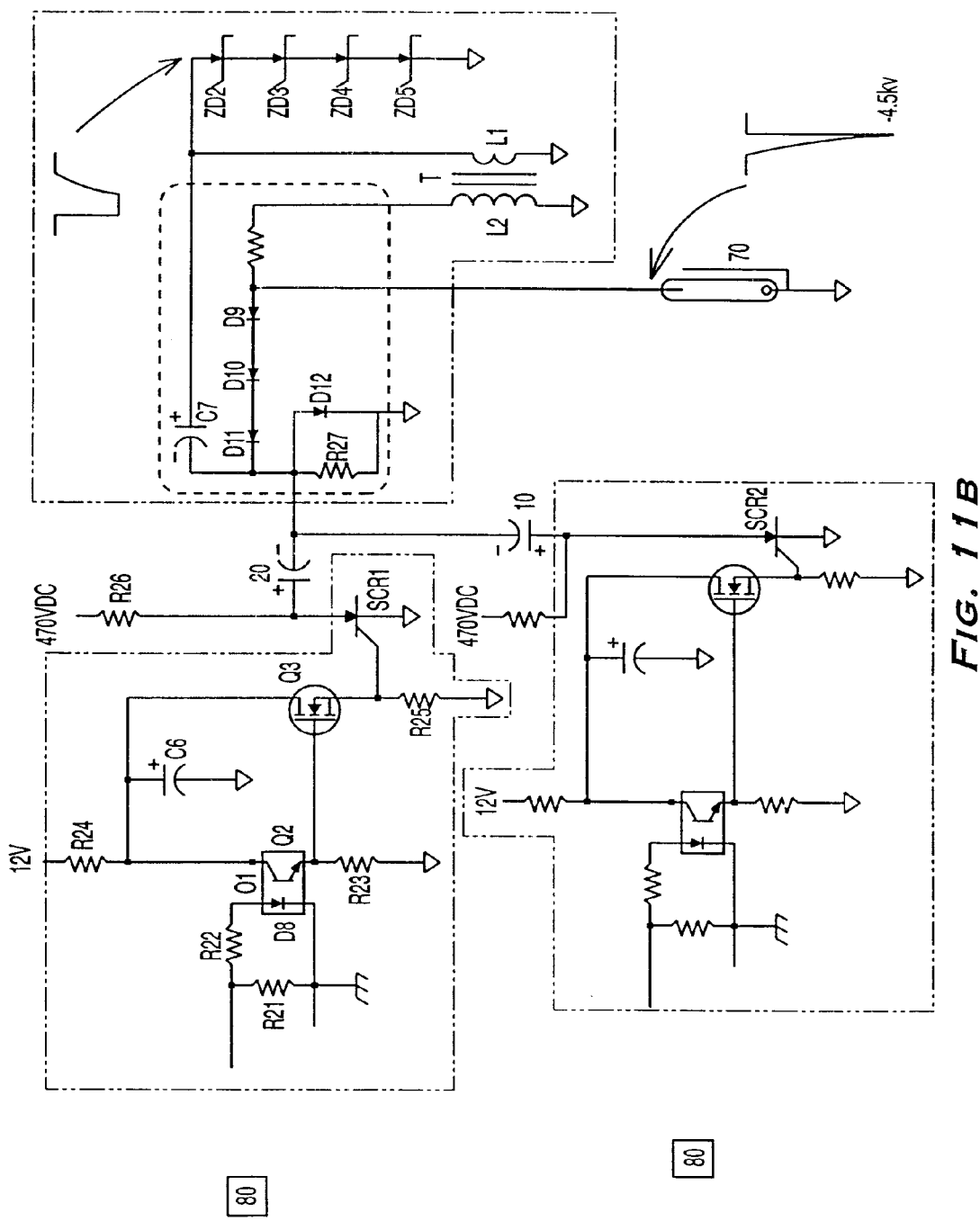

Referring to FIG. 10, the increase in the portability of the second system 100 over the first system 10 is also due to the use of a single flash bulb assembly 144, and associated circuitry in the strobe light unit. The strobe light unit has a single flash bulb assembly 144 capable of flashing faster than every 1000 microseconds. The circuits used with the strobe light unit are the subject of another commonly assigned application (application Ser. No. 09/008,588), which is incorporated herein in its entirety by express reference thereto. A diagram of the circuit used for the strobe light unit is illustrated in FIGS. 11A and 11B. As there is only a single flash bulb in the strobe light unit, it will be appreciated that two additional reflective elements are required. Referring to FIG. 6, a third light-reflecting panel 164 reflects about one-half of the light from flash bulb into panel 146 while a fourth light-reflecting panel 166 reflects the other half of the light into light-reflecting panel 148. The respective set-ups for both the calibration mode and the operation mode of system 100 are shown in FIGS. 7–8 and 9, respectively.

Figure 12:
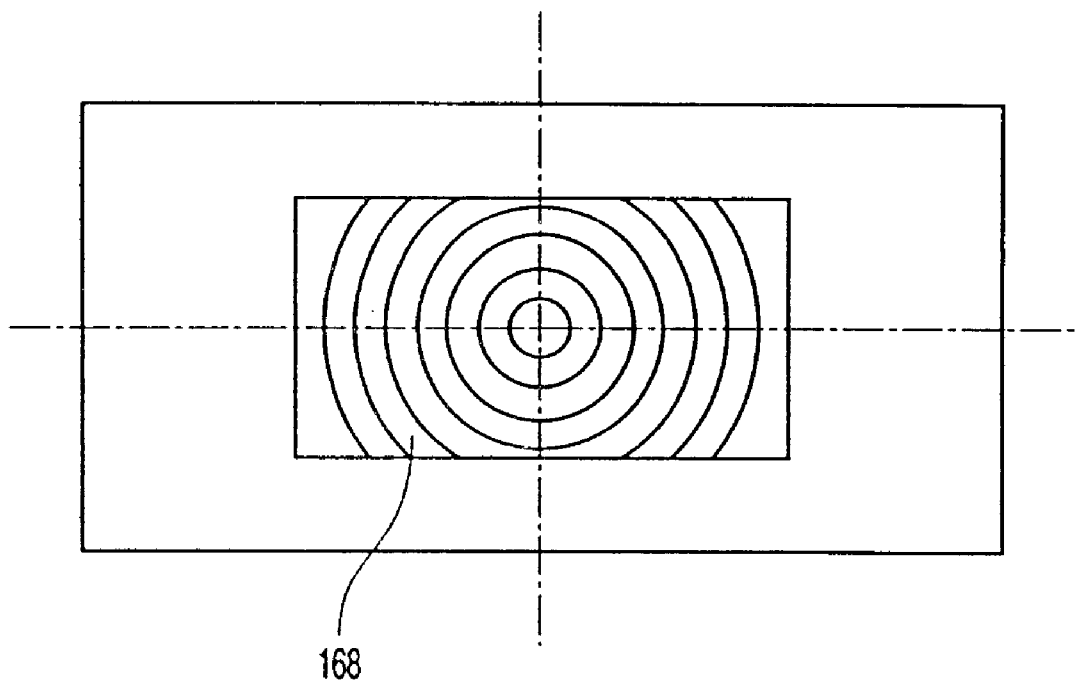
FIG. 12 is an example of a Fresnel lens used in the present invention.
Figure 13:
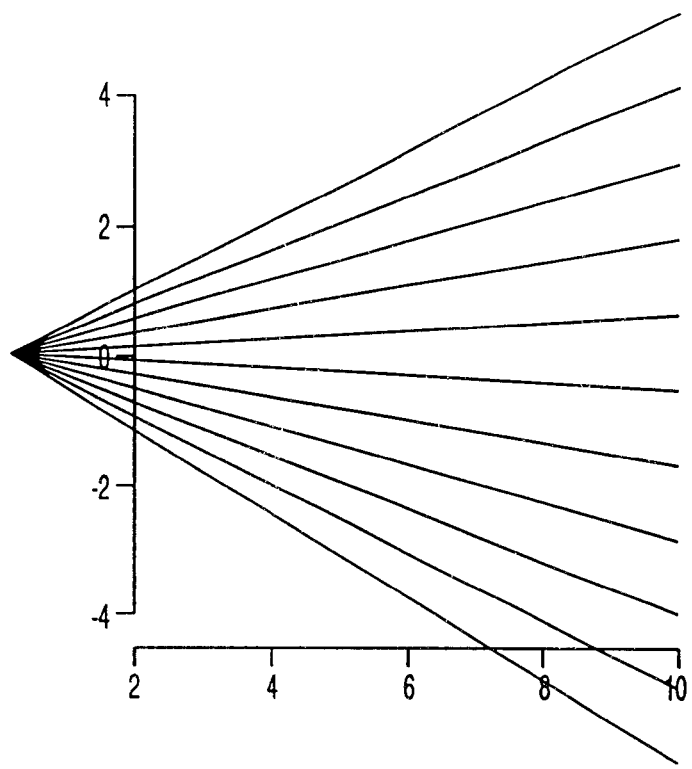
FIG. 13 illustrates a light pattern without a Fresnel lens.
Figure 14:
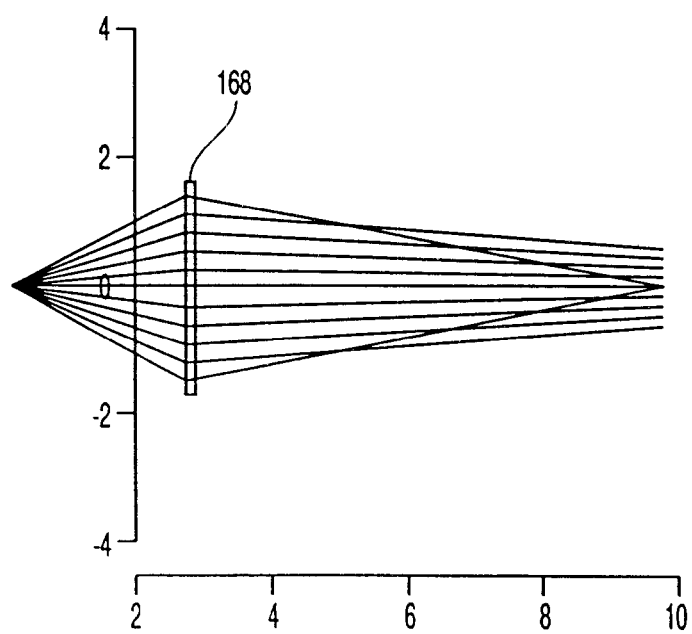
FIG. 14 illustrates a light pattern with a Fresnel lens.

To increase the amount of light directed to the reflective elements or panels 146, 148, 164, and 166, the system 100 preferably has an optical or Fresnel lens 168 (as shown in FIG. 12) inserted at the front of the control box 140, placed between the flash bulb assembly 144 and the third and fourth reflective elements or panels 164, 166 as shown in FIGS. 6 and 10. A lens assembly is formed by the lighting unit and the Fresnel lens. The Fresnel lens 168 directs light from the flash bulb assembly 144 to the third and fourth reflective elements 164, 168. The Fresnel lens has a collimating effect on the light from a cylindrical flash tube. Thus, light pattern with the Fresnel lens 168 controls the dispersion of light as shown in FIG. 14. FIG. 13 shows the light pattern without the Fresnel lens 168. The lens 168 preferably has a focal length of about 3 inches, and the center of the flash bulb assembly 144 is less than 3 inches behind the lens. This arrangement allows the system 100 to have a smaller flash bulb assembly 144 than without the lens 168 because the collimation of the light increases the flux of light at the golf ball in the predetermined field-of-view. This increase in the flux allows the possibility of using other reflective materials (or none at all), as well as the use of the system in brighter lighting conditions, including full-sun daylight.

Figure 15:
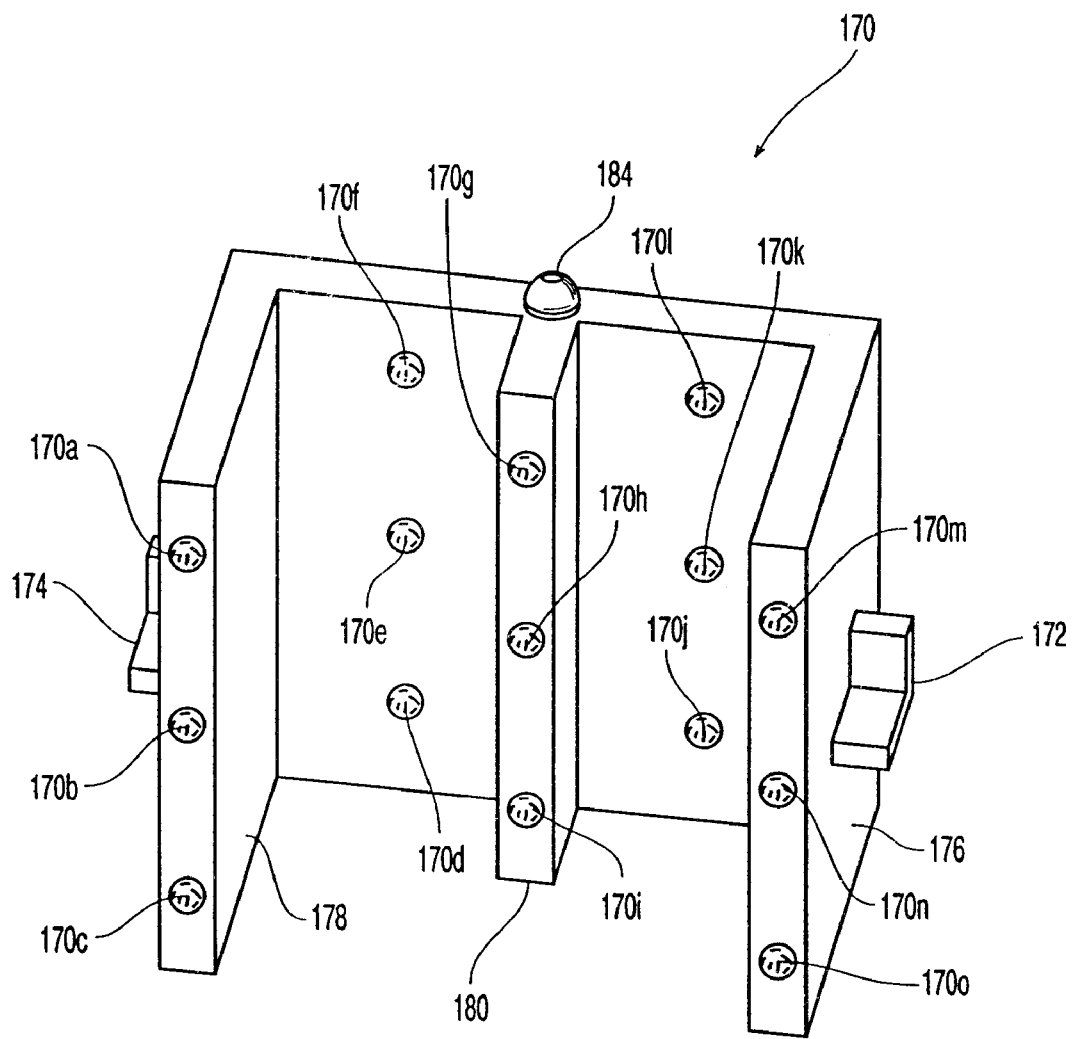
FIG. 15 is a perspective view of the calibration fixture carrying fifteen illuminable areas.

As shown in FIG. 15, and in use with the system in FIGS. 7 and 8, a calibration fixture 170 is provided to calibrate the system. Although this discussion is with reference to system 100, it applies equally to system 10. The fixture 170 includes receiving elements or tabs 172, 174 extending outwardly from outer legs 176, 178 for receiving an end portion of the distance calibrators 158, 160. When positioned at this location in accordance with the distance calibrators 158, 160, a central leg 180 of fixture 170 is disposed at the proper location for a golf ball 182 used in a launch monitoring operation, as shown in FIG. 9. Golf ball 182 also has the pattern of retro-reflective dots as golf ball 41 (as shown in FIG. 5) in the first embodiment. Calibration fixture 170 further includes an optical level indicator 184 on a top surface thereof for allowing fixture 170 to be leveled before the calibration procedure. Finally, spikes 186, 188 (as shown in FIG. 8) extending from the bottom of fixture 170 are inserted into the turf to stabilize fixture 170 during the calibration procedure. It will be appreciated that calibration fixture 170 and golf ball 182 are also preferably used with the first embodiment shown in FIGS. 1–3 in the same manner discussed here. In this regard, fixture 170 has a pattern of retro-reflective dots 170a–o, as shown in FIG. 15. Applicants have found that only 15 dots (as opposed to the twenty dots used on the calibration fixture of the parent application-application Ser. No. 08/751,447) are necessary. Since the longitudinal movement of the golf ball is greater than its vertical movement during the time between the two images (see, e.g., FIG. 4), the calibration of the system need not be as precise in the vertical direction. Therefore, fewer dots in the vertical direction on the calibration fixture are needed to adequately calibrate the system.

As a further means for providing portability to the launch monitoring systems of the present invention, and as shown in FIGS. 16 and 17, rod 190 (which may also be the same as rod 22 for system 10) may be easily disassembled for transport and reassembled on site before operation of any of the disclosed launch monitoring systems. Specifically, rod 190 may comprise a plurality of sections 190a–d. Preferably, each of these sections comprises a hollow tube containing a single elastic cord 192 affixed at opposite ends of rod 190. Cord 192 has a relaxed length less than the total length of rod 190 in order to hold sections 190a–d together. Sections 190a, 190b, 190c have respective reduced diameter portions 194, 196, 198 that fit within respective ends of sections 190b, 190c, 190d. Pins 200, 202 are provided at opposite ends of rod 190 to allow the rod 190 to be secured into the turf.

Figure 18:
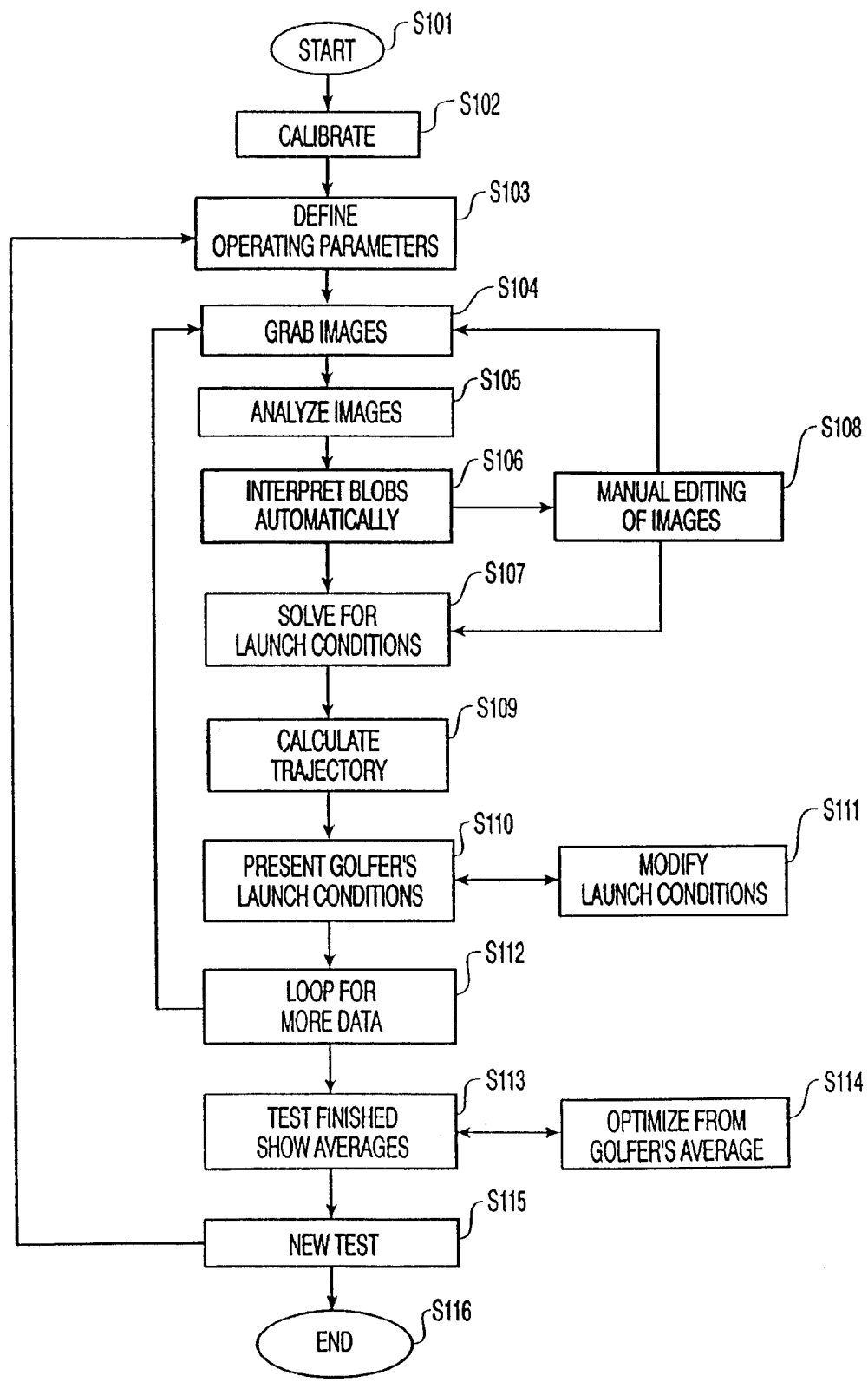
FIG. 18 is a flow chart describing the operation of the system.

The use of both systems 10 and 100 is shown generally in FIG. 18.

At step S101, the system starts and determines if this is the first time the system has been used. By default, the system will use the last calibration when it is first activated. Therefore, the system must be calibrated each time the system is moved and/or turned on.

At step S102, the system is calibrated to define the coordinate system to be used by the system.

After the system is calibrated, the system is set at step S103 for either the left- or right-handed orientation, depending on the golfer to be tested. The selection of the left-handed orientation requires one set of coordinates are used for the left-handed golfer and right-handed system requires another set of coordinates for a right-handed golfer. At this time, the system is also set up as either a test or a demonstration. If the test mode is selected, the system will save the test data, while in the demonstration mode it will not save the data.

At step S103, additional data specific to the location of the test and the golfer is entered as well. Specifically, the operator enters data for ambient conditions such as temperature, humidity, wind speed and direction, elevation, and type of turf to be used in making the calculations for the golf ball flight, roll, and total distance. The operator also inputs the personal data of the golfer. This personal data includes name, age, handicap, gender, golf ball type (for use in trajectory calculations discussed below), and golf club used (type, club head, shaft).

After this data is entered, the system is ready for use and moves to step S104. At step S104, the system waits for a sound trigger from the microphone. When there is a sound of a sufficient level or type, the system takes two images (as shown in FIG. 4) of the golf ball in the predetermined field-of-view separated by a short time interval, preferably 800 microseconds, with each of the two cameras 136, 138 (as shown in FIG. 6). The images recorded by the silicon panel 39 are used by the system to determine the flight characteristics of the golf ball.

At steps S105–S107, the system uses several algorithms stored in the computer to determine the location of the golf ball relative to the monitor. After the computer has determined the location of the golf ball from the images, the system (and computer algorithms) determine the launch conditions. These determinations, which correspond to steps S105, S106, and S107, include locating the bright areas in the images, determining which of those bright areas correspond to the dots on the golf ball, and, then using this information to determine the location of the golf ball from the images, and calculate the launch conditions, respectively. Specifically, the system, at step S105, analyzes the images recorded by the cameras by locating the bright areas in the images. A bright area in the image corresponds to light from the flash bulb assembly 144 reflecting off of the retro-reflective dots or markers on the golf ball. Since the golf ball preferably has 6 dots on it, the system should find twelve bright areas that represent the dots in the images from each of the cameras (2 images of the golf ball with 6 dots). The system then determines which of those bright areas correspond to the golf ball's reflective dots at step S106. As discussed in detail below with reference to FIG. 20, this can be done in several ways. If only twelve dots are found in the image, the system moves on to step S107 to determine, from the dots in the images, the position and orientation of the golf ball during the first and second images. However, if there are more or less than twelve dots or bright areas found in the images, then at step S108 the system allows the operator to manually change the images. If too few bright areas are located, the operator adjusts the image brightness, and if too many are present, the operator may delete any additional bright areas. In some instances, the bright areas in the images may be reflections off of other parts of the golf ball or off the golf club head. If it is not possible to adequately adjust the brightness or eliminate those extraneous bright areas, then the system returns the operator to step S104 to have the golfer hit another golf ball. If the manual editing of the areas is successful, however, then the system goes to step S107.

At step S107, the system uses the identification of the dots in step S106 to determine the location of the centers of each of the twelve dots in each of the two images. Knowing the location of the center of each of the dots, the system can calculate the golf ball's spin rate, velocity, and direction.

At step S109, the system uses this information, as well as the ambient conditions and the golf ball information entered at step S103 to calculate the trajectory of the golf ball during the shot. The system will also estimate where the golf ball will land (carry), and even how far it will roll, giving a total distance for the shot. Because the system is calibrated in three dimensions, the system will also be able to calculate if the golf ball has been sliced or hooked, and how far off line the ball will be.

This information (i.e., the golfer's launch conditions) is then presented to the golfer at step S110, in numerical and/or graphical formats. At step S111, the system can also calculate the same information if a different golf ball had been used (e.g., a two-piece rather than a three-piece golf ball). It is also possible to determine what effect a variation in any of the launch conditions (golf ball speed, spin rate, and launch angle) would have on the results.

The golfer also has the option after step S112 to take more shots by returning the system to step S104. If the player had chosen the test mode at step S103 and several different shots were taken, at step S113 the system calculates and presents the average of all data accumulated during the test. At step S114, the system presents the golfer with the ideal launch conditions for the player's specific capabilities, thereby allowing the player to make changes and maximize distance. The system allows the golfer to start a new test with a new golf club, for example, at step S116, or to end the session at S116.

Figure 19:
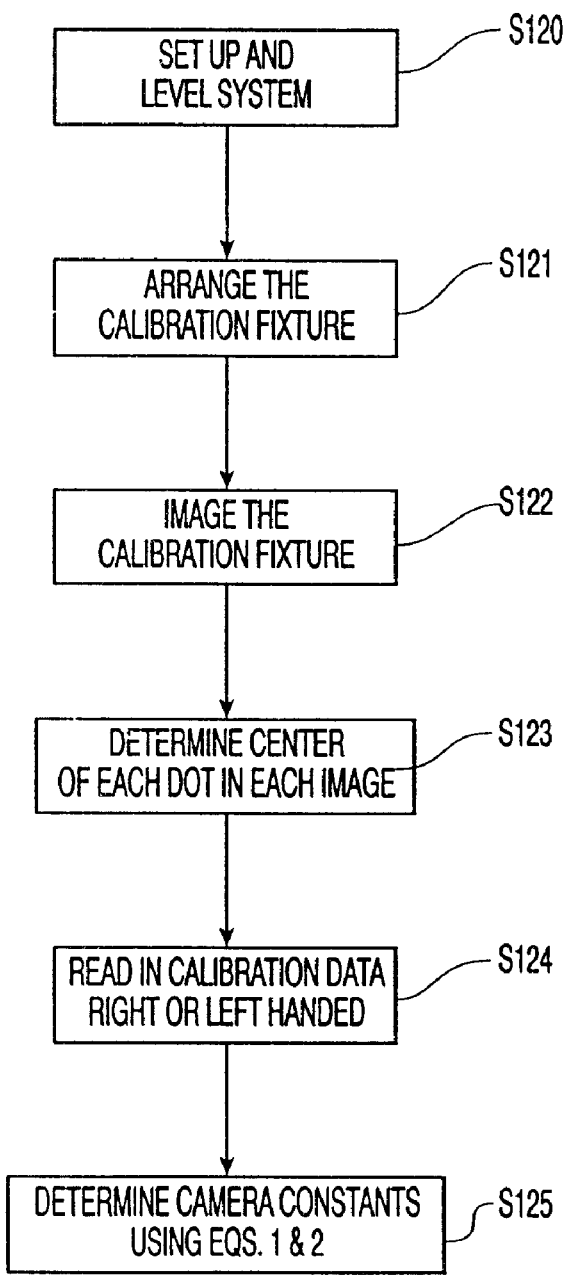
FIG. 19 is a flow chart describing the calibration of the system.

Now turning to the first of these steps in detail (FIG. 19), the calibration of the system begins with setting up and leveling the system in step S120. The system is preferably set up on level ground, such as a practice tee or on a level, large field. Obviously, it is also possible to perform the tests indoors, hitting into a net. Referring to FIGS. 6–8, to level the system, the operator uses the threaded rods 128, 130 and nuts 132, 134. Referring to FIGS. 7 and 8, the system is positioned to set the best view of the event and the predetermined field-of-view. Then at step S121, the calibration fixture 170 is placed in the appropriate location, which is at the end of the distance calibrators 158, 160. The calibration fixture 170 must be level and parallel to the system to ensure the best reflection of the light from the flash bulb assembly 144. Placing the calibration fixture at the end of the distance calibrators 158, 160 ensures that during the test, the calibration fixture 170 and the golf ball are in full view of each of the cameras. Both cameras take a picture of the calibration fixture and send the image to a buffer in step S122.

In step S123, the system, including a calibration algorithm, must then determine the location of the centers of the spots in each image corresponding to the calibration fixture's retro-reflective dots. In one embodiment, the system locates the centers of these spots by identifying the positions of the pixels in the buffer that have a light intensity greater than a predetermined threshold value. Since the images are two-dimensional, the positions of the pixels have two components (x,y). The system searches the images for bright areas and finds the edges of each of the bright areas. The system then provides a rough estimate of the centers of each of the bright areas. Then all of the bright pixels in each of the bright areas are averaged and an accurate dot position and size are calculated for all 15 areas. Those with areas smaller than a minimum area are ignored.

Once the location of each of the dots on the calibration fixture with respect to camera are determined, the system must know the true spacing of the dots on the calibration fixture. As shown in FIG. 15, the calibration fixture has dots arranged in three rows and five columns. The dots are placed about one inch apart, and on three separate X planes that are 1.5 inches apart. The X, Y, and Z coordinates of the center of each dot 170a–o, which are arranged in a three-dimensional pattern, were pre-measured to accuracy of one of one-ten thousandth of an inch on a digitizing table and stored in the computer. The system recalls the previously stored data of the three-dimensional positions of the dots on the calibration fixture relative to one another. The recalled data depends on the whether a right-handed (X-axis points toward the golfer) or a left-handed (X-axis points away from the golfer) system is used. Both sets of data are stored and can be selected by the operator at step S124. An exemplary set of these three dimensional positions for right hand calibration for the calibration fixture with 15 dots appear below:

| | | |
|---|---|---|
| (1) −1.5 3.0 0.0 | (2) 1.5 3.0 1.0 | (3) 0.0 3.0 2.0 |
| (4) 1.5 3.0 3.0 | (5) −1.5 3.0 4.0 | (6) −1.5 2.0 0.0 |
| (7) 1.5 2.0 1.0 | (8) 0.0 2.0 2.0 | (9) 1.5 2.0 3.0 |
| (10) −1.5 2.0 4.0 | (11) −1.5 1.0 0.0 | (12) 1.5 1.0 1.0 |
| (13) 0.0 1.0 2.0 | (14) 1.5 1.0 3.0 | (15) −1.5 1.0 4.0 |

An exemplary set of these three dimensional positions for left hand calibration for the calibration fixture with 15 dots appear below:

| | | |
|---|---|---|
| (1) 1.5 3.0 4.0 | (2) −1.5 3.0 3.0 | (3) 0.0 3.0 2.0 |
| (4) −1.5 3.0 1.0 | (5) 1.5 3.0 0.0 | (6) 1.5 2.0 4.0 |
| (7) −1.5 2.0 3.0 | (8) 0.0 2.0 2.0 | (9) −1.5 2.0 1.0 |
| (10) 1.5 2.0 0.0 | (11) 1.5 1.0 4.0 | (12) −1.5 1.0 3.0 |
| (13) 0.0 1.0 2.0 | (14) −1.5 1.0 1.0 | (15) 1.5 1.0 0.0 |

At step S125, using the images of the calibration fixture, the system determines eleven (11) constants relating image space coordinates U and V to the known fifteen X, Y, and Z positions on the calibration fixture. The equations relating the calibrated X(I), Y(I), Z(I) spaced points with the $U_i^j$, $V_i^j$ image points are:

$$U_i^j = \frac{D_{1j}X(i) + D_{2j}Y(i) + D_{3j}Z(i) + D_{4j}}{D_{9j}X(i) + D_{10j}Y(i) + D_{11j}Z(i) + 1} \quad \text{(Eq. 1)}$$

where i=1, 15; j=1,2.

$$V_i^j = \frac{D_{5j}X(i) + D_{6j}Y(i) + D_{7j}Z(i) + D_{8j}}{D_{9j}X(i) + D_{10j}Y(i) + D_{11j}Z(i) + 1} \quad \text{(Eq. 2)}$$

The eleven constants, $D_{i1}$ (I=1,11), for camera 136 and the eleven constants, $D_{i2}$ (I=1,11), for camera 138 are solved from knowing X(I), Y(I), Z(I) at the 15 locations and the 15 $U_i^j$, $V_i^j$ coordinates measured in the calibration photo for the two cameras.

In another embodiment, during image analysis the system uses the standard Run Length Encoding (RLE) technique to locate the bright areas. The RLE technique is conventional and known by those of ordinary skill in the art. Image analysis can occur during calibration or during an actual shot. Once the bright areas are located using the RLE technique, the system then calculates an aspect ratio of all bright areas in the image to determine which of the areas are the retro-reflective markers. The technique for determining which bright areas are the dots is discussed in detail below with respect to FIG. 20.

As noted above, once the system is calibrated in step S102, the operator can enter the ambient conditions, including temperature, humidity, wind, elevation, and turf conditions. Next, the operator inputs data about the golfer. For example, the operator enters information about the golfer, including the golfer's name, the test location, gender, age and the golfer's handicap. The operator also identifies the golf ball type and club type, including shaft information, for each test.

A golf ball is then set on a tee where the calibration fixture was located and the golfer takes a swing. The system is triggered when a sound trigger from the club hitting the golf ball is sent via microphone to the system. The strobe light unit is activated causing a first image to be recorded by both cameras. There is an intervening, predetermined time delay, preferably 800 microseconds, before the strobe light flashes again. The time delay is limited on one side by the ability to flash the strobe light and on the other side by the field-of-view. If the time delay is too long, the field-of-view may not be large enough to capture the golf ball in the cameras' views for both images. The cameras used in the systems 10 and 100 allow for both images (which occur during the first and the second strobe flashes) to be recorded in one image frame. Because the images are recorded when the strobe light flashes (due to reflections from the retro-reflective material on the golf ball), the flashes can be as close together as needed without concerns for the constraints of a mechanically shuttered camera.

This sequence produces an image of the reflections of light off of the retro-reflective dots on each light sensitive panel of the cameras. The location of the dots in each of the images are preferably determined with the RLE technique which was discussed for the calibration fixture.

Figure 20:
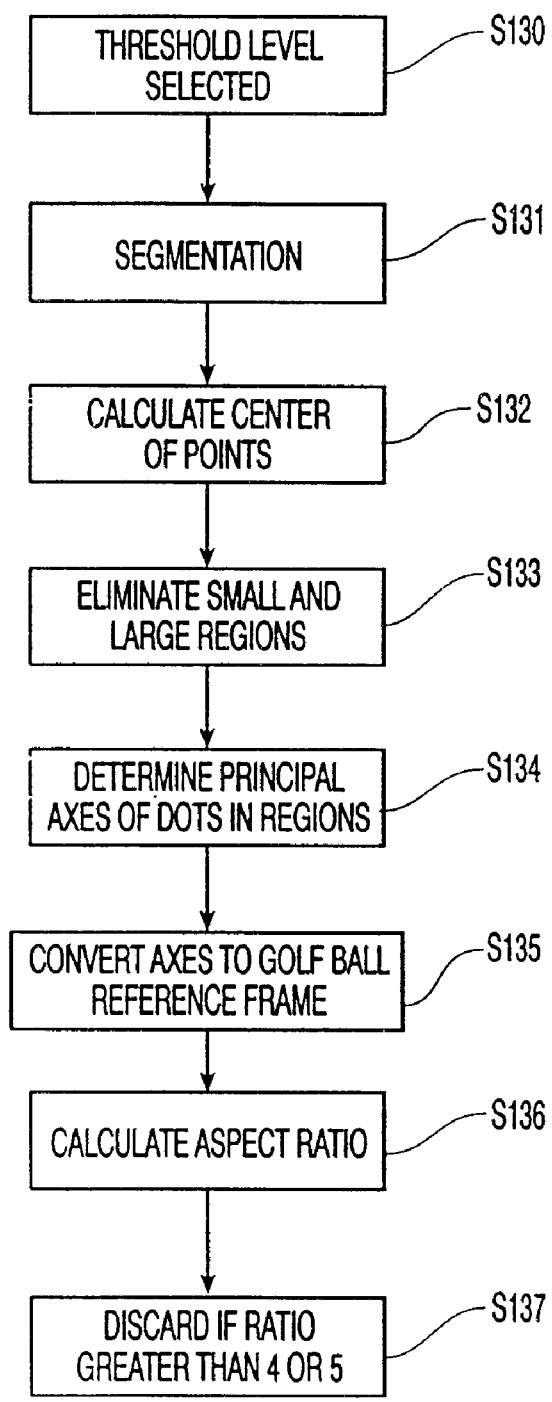
FIG. 20 is a flow chart describing the determination of dots in the image.

The technique used for determining the aspect ratio to determine which bright areas are dots will now be described in conjunction with FIG. 20. As shown in step S130, the image must have an appropriate brightness threshold level chosen. By setting the correct threshold level for the image to a predetermined level, all pixels in the image are shown either as black or white. Second, at step S131, the images are segmented into distinct segments, corresponding to the bright areas in each of the images. The system, at step S132, determines the center of each area by first calculating the following summations at each of the segments using the following equations:

$$S_x = \Sigma X_i \quad \text{(Eq. 3)}$$
$$S_y = \Sigma Y_i \quad \text{(Eq. 4)}$$
$$S_{xx} = \Sigma X_i^2 \quad \text{(Eq. 5)}$$
$$S_{yy} = \Sigma Y_i^2 \quad \text{(Eq. 6)}$$
$$S_{xy} = \Sigma X_i Y_i \quad \text{((Eq. 7)}$$

Once these sums, which are the sums of the bright areas, have been accumulated for each of the segments in the image, the net moments about the x and y axes are calculated using the following equations:

$$I_x = S_{xx} - \frac{S_x^2}{AREA} \quad \text{(Eq. 8)}$$

$$I_y = S_{yy} - \frac{S_y^2}{AREA} \quad \text{(Eq. 9)}$$

$$I_{xy} = S_{xy} - \frac{S_x S_y}{AREA} \quad \text{(Eq. 10)}$$

where AREA is the number of pixels in each bright area.

At step S133, the system eliminates those areas of brightness in the image that have an area outside a predetermined range. Thus, areas that are too large and too small are eliminated. In the preferred embodiment, the dots on the golf ball are ¼"–⅛" and the camera has 753×244 pixels, so that the dots should have an area of about 105 pixels in the images. However, glare by specular reflection, including that from the club head and other objects, may cause additional bright areas to appear in each of the images. Thus, if the areas are much less or much more than 105 pixels, then the system can ignore the areas since they cannot be a marker on the golf ball.

For those areas that remain (i.e., that are approximately 105 pixels) the system determines which are the correct twelve in the following manner. The system assumes that the dots will leave an elliptical shape in the image due to the fact that the dots are round and the golf ball's movement during the time that the strobe light is on. Therefore, at step S134 the system then calculates the principal moments of inertia of each area using the following equations:

$$I_{x'} = \frac{I_x + I_y}{2} + \sqrt{\left(\frac{I_x - I_y}{2}\right)^2 + I_{xy}^2} \quad \text{(Eq. 11)}$$

$$I_{y'} = \frac{I_x + I_y}{2} - \sqrt{\left(\frac{I_x - I_y}{2}\right)^2 + I_{xy}^2} \quad \text{(Eq. 12)}$$

Finally, at step S136 the aspect ratio is calculated using the following equation:

$$R = \frac{I_{x'}}{I_{y'}} \quad \text{(Eq. 13)}$$

and the dot is rejected at step S137 if the aspect ratio is greater than four or five.

Returning to FIG. 18, once the locations of the dots are determined, the system computes the translational velocity of the center of the golf ball and angular velocity (spin rate) of the golf ball at step S107 in the following manner. First, the system uses the triangulation from the data of cameras to locate the position of the six dots on the surface of the golf ball. Specifically, the system solves the set of four linear equations shown below to determine the position (x,y,z) in the golf ball's coordinate system of each dot on the surface of the golf ball.

$$(D_{9,1}U^1 - D_{1,1})x + (D_{10,1}U^1 - D_{2,1})y + (D_{11,1}U^1 - D_{3,1})z + (U^1 - D_{4,1}) \quad \text{(Eq. 14)}$$

$$(D_{9,1}V^1 - D_{5,1})x + (D_{10,1}V^1 - D_{6,1})y + (D_{11,1}V^1 - D_{7,1})z + (V^1 - D_{8,1}) \quad \text{(Eq. 15)}$$

$$(D_{9,2}U^2 - D_{1,2})x + (D_{10,2}U^2 - D_{2,2})y + (D_{11,2}U^2 - D_{3,2})z + (U^2 - D_{4,2}) \quad \text{(Eq. 16)}$$

$$(D_{9,2}V^2 - D_{5,2})x + (D_{10,2}V^2 - D_{6,2})y + (D_{11,2}V^2 - D_{7,2})z + (V^2 - D_{8,2}) \quad \text{(Eq. 17)}$$

where $D_{ij}$ are the eleven constants determined by the calibration method at steps S102 (FIG. 18) and S125 (FIG. 19), where i identifies the constant and j identifies the image.

Next, the system converts the dot locations (determined at step S135, FIG. 20) in the golf ball coordinate system to the reference global system of the calibrated cameras 136, 138 using the following matrix equation:

$$\begin{bmatrix} x_g \\ y_g \\ z_g \end{bmatrix} = \begin{bmatrix} T_x \\ T_y \\ T_z \end{bmatrix} + \begin{bmatrix} M_{11} & M_{12} & M_{13} \\ M_{21} & M_{22} & M_{23} \\ M_{31} & M_{32} & M_{33} \end{bmatrix} \begin{bmatrix} x_b \\ y_b \\ z_b \end{bmatrix} \quad \text{(Eq. 18)}$$

where Xg, Yg, Zg are the global coordinates of the center of the golf ball. The column vector, $T_x, T_y, T_z$, is the location of the center of the golf ball in the global coordinate system. The matrix elements $M_{ij}$ (i=1,3; j=1,3) are the direction cosines defining the orientation of the golf ball coordinate system relative to the global system. The three angles $a_1, a_2, a_3$ describe the elements of matrix $M_{ij}$ in terms of periodic functions. Substituting matrix equation for the global position of each reflector into the set of four linear equations shown above, a set of 28 equations result for the six unknown variables $(T_x, T_y, T_z, a_1, a_2, a_3)$. A similar set of 28 equations must be solved for the second image of the golf ball. Typically, the solution of the three variables $T_x, T_y, T_z$ and the three angles at $a_1, a_2, a_3$ that prescribed the rotation matrix M is solvable in four iterations for the 28 equations that must be simultaneously satisfied.

The kinematic variables, three components of translational velocity and three components of angular velocity in the global coordinate system, are calculated from the relative translation of the center of mass and relative rotation angles that the golf ball makes between its two image positions.

The velocity components of the center of mass $V_x, V_y, V_z$ along the three axes of the global coordinate system are given by the following equations:

$$V_x = \frac{T_x(t + \Delta T) - T_x(t)}{\Delta T};$$

$$V_y = \frac{T_y(t + \Delta T) - T_y(t)}{\Delta T};$$

$$V_z = \frac{T_z(t + \Delta T) - T_z(t)}{\Delta T}$$

(Eqs. 19, 20, and 21, respectively) in which t is the time of the first strobe measurement of $T_x, T_y, T_z$ and $\Delta T$ is the time between images.

The spin rate components in the global axis system result from obtaining the product of the inverse orientation matrix, $M^T(t)$ and $M(t+\Delta T)$. The resulting relative orientation matrix, A, $A(t,t+\Delta t)=M(t+\Delta t)M^T(t)$, measures the angular difference of the two strobe golf ball images.

The magnitude $\Theta$ of the angle of rotation about the spin axis during the time increment $\Delta T$ is given by:

$$\theta = \sin^{-1}\left(\frac{R}{2}\right) \qquad \text{(Eq. 22)}$$

where $$R = \sqrt{1^2 + m^2 + n^2};$$

$l = A_{32} - A_{23}$; $m = A_{13} - A_{31}$; and $n = A_{21} - A_{12}$.

The three orthogonal components of spin rate, $W_x, W_y, W_z$, are given by the following equations:

$$W_x = \frac{\Theta L}{R \Delta t} \qquad \text{(Eq. 23)}$$

$$W_y = \frac{\Theta M}{R \Delta t} \qquad \text{(Eq. 24)}$$

$$W_z = \frac{\Theta N}{R \Delta t} \qquad \text{(Eq. 25)}$$

At step S109 of FIG. 18, the system, including a computer algorithm, then computes the trajectories for the tests using the initial velocity and initial spin rate which were computed in step S107. For each time increment, the system interpolates the forces on the golf ball at time T and calculates the velocity at time T+1 from the velocity of the golf ball and the forces on the golf ball at time T. Next, the system computes the mean velocity and the Reynold's number, which is the ratio of the flow's inertial forces to the flow's viscous forces during the time interval from time T to time T+1. The system then interpolates the mean forces, from which the system calculates the velocity at time T+1. The forces include the drag force, the lift due to the spin of the golf ball, and gravitational forces. Using the velocity at time T+1, the system can compute the position at time T+1. Finally, the system computes the spin rate at time T+1. In the preferred embodiment, the length of the time interval is 0.1 seconds. This calculation is performed until the golf ball reaches the ground.

The system uses the following equations to perform these calculations. For the drag force on the golf ball, the force is calculated by:

$$F_d = c_d * \tfrac{1}{2} * \rho * |V^{Bf}|^2 * A; \qquad \text{(Eq. 26)}$$

where $c_d$=drag coefficient previously determined and stored in a data file that is called when the golf ball type is selected;

$\rho$=density of air—entered at step S103, the beginning of the test;

$|V^{Bf}|$=magnitude of the velocity of the golf ball; and

A=the cross-sectional area of the golf ball—also known from the golf ball selected.

The lift, caused by the spin of the golf ball, is perpendicular to the velocity direction and spin direction and is given by:

$$\underline{n}_L = \underline{N}_\omega \times \underline{n}_{VB}, \qquad \text{(Eq. 27)}$$

where $\underline{n}_L$, $\underline{N}_\omega$, and $\underline{n}_{VB}$ are the direction cosines of the lift force, the angular rotation of the golf ball, and the velocity of the golf ball, respectively.

The magnitude of the lift is given by:

$$F_L = c_L * \tfrac{1}{2} * \rho * |V^{Bf}|^2 * A \qquad \text{(Eq. 28)}$$

where $c_L$ is the lift coefficient and the other terms being defined above.

Therefore, the applied aerodynamic force on the golf ball becomes $$\underline{R}^B = \underline{n}_L F_L - \underline{n}_{VB} F_d \qquad \text{(Eq. 29)}$$

The velocity and spin of the golf ball are then transformed into the X, Y, and Z directions so that generalized velocities and rotational velocities are given by $$\underline{V}^{Bf} = u_9 \underline{X} + u_{10} \underline{Y} + u_{11} \underline{Z} \qquad \text{(Eq. 30)}$$

$$\underline{\omega}^{Bf} = u_{12} \underline{X} + u_{13} \underline{Y} + u_{14} \underline{Z} \qquad \text{(Eq. 31)}$$

where $u_9, u_{10}$, and $u_{11}$, are the velocities in the X, Y, and Z directions; and $u_{12}, u_{13}$, and $u_{14}$ are the spin velocities in the X, Y, and Z directions.

Using these equations, the system obtains the following second order differential equations:

$$n_{1x}*F_1 - n_{Vbx}*F_d - m_B*u_9 = 0 \qquad \text{(Eq. 32)}$$

$$n_{1y}*F_1 - n_{Vby}*F_d - m_B*u_{10} = 0 \qquad \text{(Eq. 33)}$$

$$n_{1z}*F_1 - n_{Vbz}*F_d - m_B*u_{11} - m_B*g = 0 \qquad \text{(Eq. 34)}$$

where $n_{1x}, n_{1y}, n_{1z}$ are the direction cosines of the force in the X, Y, and Z directions, respectively;

$n_{Vbx}$, $n_{Vby}$, and $n_{Vbz}$ are the directions of the velocity vectors in the X, Y, and Z directions, respectively;

$m_B$ is the mass of the ball; and $m_B*g$ relates to the gravitational force exerted on the golf ball in the Z direction.

These second order differential equations are then solved for each time step, preferably every 0.1 second using the drag and lift coefficients ($C_d$ and $C_L$) from data files, or from another source, based upon the velocity ($\underline{V}^{Bf}$) and angular velocity ($\omega^{Bf}$) at each of those time steps.

Figure 21:
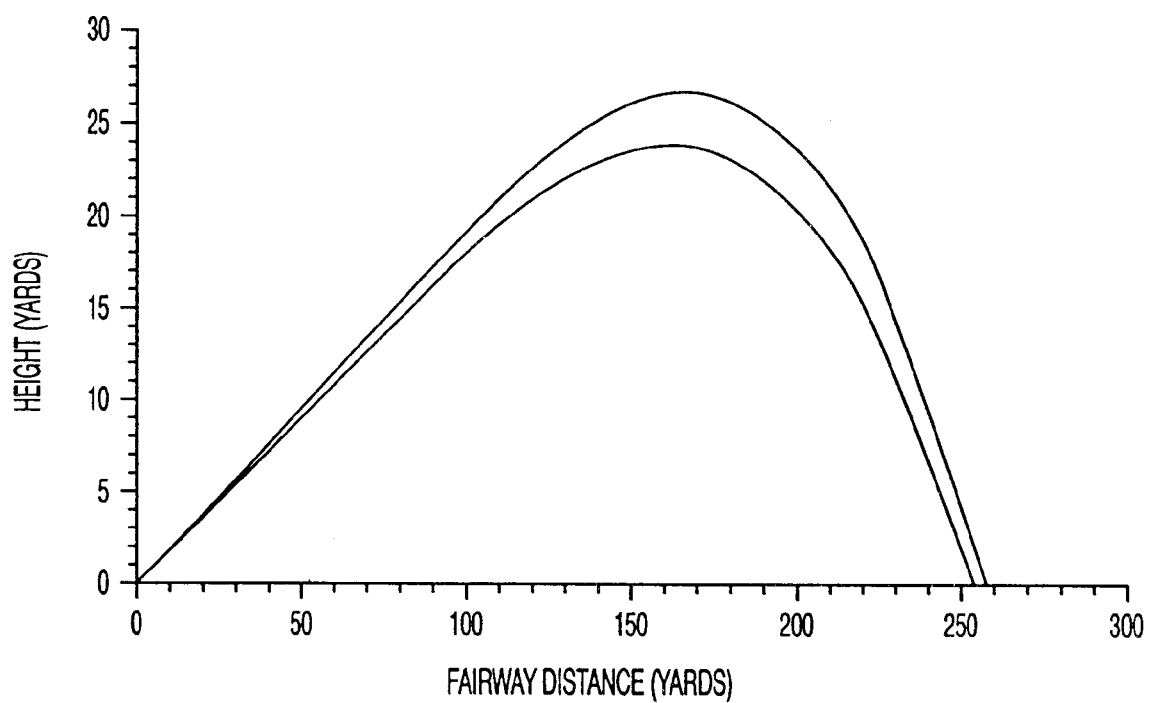
FIG. 21 is a graph showing the trajectory of the golf ball as calculated by the system.

The trajectory method repeats this procedure for successive time intervals until the computed elevation component of the golf ball's position is less than a predetermined elevation, usually zero or ground level. See FIG. 21. When the golf ball reaches ground level, the method interpolates to compute the ground impact conditions including final velocity, trajectory time, impact angle, and spin rate. Using a roll model based on empirical data and golf ball data input by the operator, the system computes the final resting position of the golf ball using the just-computed ground impact conditions. Accordingly, the system computes the total distance from the tee to the final resting position of the golf ball. A data file stores the results computed by the trajectory method.

The system then determines whether an additional test will be performed. If additional tests are to be performed, the process described above repeats, beginning at step S104 with the sound trigger through step S110 where the trajectory method computes and presents the trajectory for the golf ball.

When all tests have been performed, the analysis method computes statistics for each golf ball type used in the tests and presents the results to the operator. For the group of tests performed for each golf ball type, the system computes the average value and standard deviation from the mean for several launch characteristics including the velocity, the launch angle, the side angles, the backspin, the side spin, and the carry and roll.

Different factors contribute to the standard deviation of the measurements including the variation in the compression and resilience of the golf balls, the variation in the positioning of the dots on the golf balls, the pixel resolution of the light sensitive panels and the accuracy of the pre-measured dots on the calibration fixture. Obviously, the primary source of scatter lies in the swing variations of the typical golfer.

Upon request from the operator, the system will display the test results in various forms. For example, the system will display individual results for the golf ball type selected by the operator.

Similarly, the system in step S113 can also display tabular representations of the trajectories for the golf ball types selected by the operator. The tabular representation presents trajectory information including distance, height, velocity, spin, lift, drag, and the Reynold's number. Similarly, the analysis method displays graphical representation of the trajectories for the golf ball types selected by the operator. The system computes the graphical trajectories from the average launch conditions computed for each golf ball type.

Figure 22:
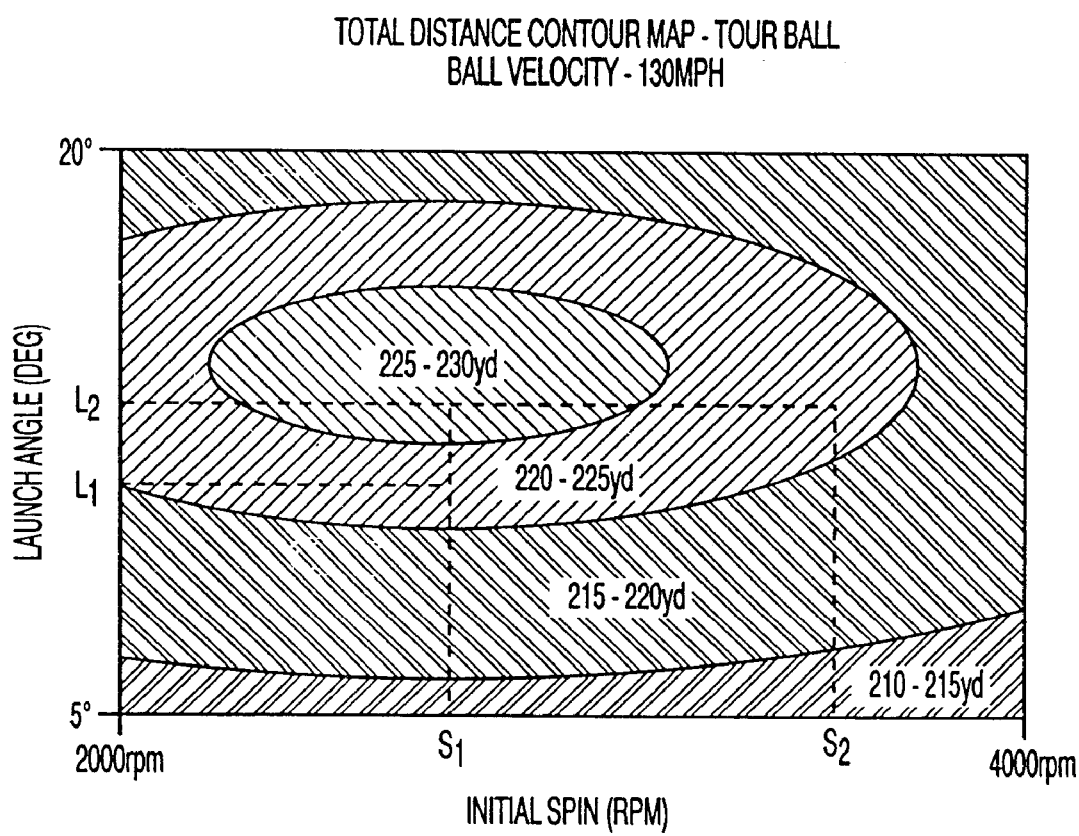
FIG. 22 is an example of a contour map of the total distance a golf ball travels under specified conditions.

At step S113, the system displays the average of each of the shots taken by the golfer. The results are displayed in a tabular and/or graphical format. The displayed results include the total distance, the spin rate, the launch angle, distance in the air, and golf ball speed. From this information, the system at step S114 shows the golfer the results if the launch angle and spin rate of the golf ball were slightly changed, allowing the golfer to optimize the equipment and/or swing. As shown in FIG. 22, the distance the golf ball travels is dependent on the initial spin rate and launch angle for a given golf ball speed. It is assumed that the golfer will not be able to increase the golf ball speed, which in turn is determined by the club head speed. (One way to increase the golf ball and club head speed, is to increase the shaft length. However, increasing the shaft length may change other variables, including the launch angle and spin rate, so a new set of tests should be done.)

At step S114, the system calculates the distances of a golf ball struck at a variety of launch angles and spin rates that are close to those for the golfer. The operator is able to choose which launch angles and spin rates are used to calculate the distances. One example is shown in FIG. 22. In this example, the system calculated the distances that a golf ball having an initial velocity of 130 mph will travel for launch angles of 0° to 15° and having initial spin rates from 2000 rpm to 4000 rpm. In order to display this particular data, the system performs the trajectory calculations described above between about 50–100 times (several predetermined values of launch angles and several predetermined values of initial spin rates). The operator can dictate the range of launch angles and spin rates the system should use, as well as how many values of each the system uses in the calculations. From the graphical data in FIG. 22, the golfer can determine which of these two variables could be changed to improve the distance.

Using FIG. 22, if the golfer had a launch angle of $L_2$ degrees and a spin rate of $S_2$ rpm, the golfer would attain a distance within the range of 220 to 225 yards. If the golfer reduced the spin rate from $S_2$ rpm to $S_1$ rpm, the distance attained would increase to the range of 225 to 230 yards. Similarly at a spin rate of $S_1$ a change in the launch angle from $L_1$ degrees to $L_2$ degrees would also increase the distance. The spin rate and launch angle can be altered simultaneously to change the distances. Knowing this information, the golfer can make the appropriate adjustments to achieve this increase in distance.

Since the golfer's data is saved, when the system is in the test mode, it is also possible to compare the golfer's data with that of other golfers, whose data were also saved. In this way, it is possible for golfers to have their data (launch angle, initial golf ball speed, spin rate, etc.) compared to others. This comparison may be done in a tabular or graphical format. Similarly, the system may compare the data from successive clubs (e.g., a 5-iron to a 6-iron to a 7-iron) to determine if there are gaps in the clubs (inconsistent distances between each of the clubs). Alternatively, two different golfers could be compared using the same or different clubs, or the same or different balls.

EXAMPLE

After calibration, a golf machine struck six balata wound golf balls and six two-piece solid golf balls under the same conditions. The following data for golf ball movement was obtained:

| Units | Ball Speed mph | Launch Angle degrees | Side Angle degrees | $W_x$ Rate rpm | $W_y$ Rate rpm | $W_z$ Rate rpm |
| --- | --- | --- | --- | --- | --- | --- |
| Average (Wound) | 156.7 | 8.5 | −0.7 | −4403 | 3 | 193 |
| Standard Deviation | 0.8 | 0.4 | 0.2 | 184 | 78 | 115 |

-continued

| Units | Ball Speed mph | Launch Angle degrees | Side Angle degrees | $W_x$ Rate rpm | $W_y$ Rate rpm | $W_z$ Rate rpm |
|---|---|---|---|---|---|---|
| Average (Two-Piece) | 156.6 | 8.8 | −0.7 | −3202 | 3 | −23 |
| Standard Deviation | 1.0 | 0.3 | 0.2 | 126 | 197 | 137 |

These results illustrate the effect of two different golf ball constructions on launch conditions. The launch variable primarily affected is the resulting backspin of the golf ball ($W_x$ rate) on squarely hit golf shots. A secondary effect is the lower launch angle of wound construction versus two-piece solid golf balls with high modulus ionomer cover material.

While the above invention has been described with reference to certain preferred embodiments, it should be kept in mind that the scope of the present invention is not limited to these embodiments. One skilled in the art may find variations of these preferred embodiments which, nevertheless, fall within the spirit of the present invention, whose scope is defined by the claims set forth below.

What is claimed is:

1. A method of reducing extraneous areas of brightness in an image of a spinning sphere having contrasting elements, comprising the steps of:
   segmenting the image into a respective number of areas of brightness;
   calculating the center of each of the areas of brightness;
   determining the principle axes of the areas of brightness;
   calculating a ratio of the principle axes of each area of brightness;
   eliminating the area of brightness if the ratio of the principle axes exceeds a predetermined value.

2. The method of claim 1, wherein the step of calculating the center of each of the areas of brightness includes performing a plurality of summations for the areas of brightness and calculating net moments about two axes.

3. The method of claim 1, wherein the segmenting step is preceded by setting a brightness threshold level in the image to a predetermined level.

4. The method of claim 1, wherein the center calculating step is preceded by eliminating areas of brightness in the image that have an area different from a predetermined area.

5. The method of claim 4, wherein the predetermined area is about 105 pixels.

6. A method of filtering an image of a moving object having reflective markers comprising the steps of:
   displaying portions of the image which have a brightness above a predetermined threshold level in a first color;
   displaying portions of the image which have a brightness below the threshold level in a second color;
   segmenting the first color portions into areas of brightness;
   eliminating areas of brightness in the image that have an area outside a predetermined range; and
   eliminating areas of brightness in the image that have an aspect ratio greater than a predetermined value.

7. The method of claim 6, wherein the predetermined value is 4.

8. The method of claim 6, wherein the predetermined value is 5.

9. A method of processing images of a moving object having reflective markers comprising the steps of:
   capturing at least one bright image of the object;
   dividing the image into a plurality of pixels;
   assigning a color to each pixel, the assigned color being either a first color if the pixel has a brightness above a predetermined threshold level or another color if the pixel has a brightness below the predetermined threshold level;
   connecting adjacent pixels of the first color to form bright areas;
   corresponding the bright areas to the markers on the object; and
   calculating the location of the markers from the at least one image.

10. The method of claim 9, wherein the capturing step further comprises the steps of:
    capturing a first pair of images on a first image frame of a first camera; and
    capturing a second pair of images on a second image frame of a second camera.

11. The method of claim 9, wherein the calculating step further comprises the step of mathematically comparing the first pair of images with the second pair of images.

12. The method of claim 9, wherein the corresponding step further comprises the step of eliminating extraneous areas of brightness from the image.

13. The method of claim 9, further comprising determining at least one of the transverse velocity and spin rate of the object.

14. The method of claim 9, wherein the dividing includes dividing the image into rows and columns of pixels.

15. The method of claim 14, wherein the dividing further includes dividing the image into 753 pixels by 244 pixels.

16. The method of claim 9, further comprising:
    determining if any of the bright areas are aberrant bright areas that do not correspond to one of the markers; and
    ignoring the aberrant bright areas.

17. The method of claim 16, wherein the determining includes determining whether any of the bright areas have an area outside a predetermined range of areas.

* * * * *